United States Patent
Clark et al.

(10) Patent No.: US 12,487,625 B2
(45) Date of Patent: Dec. 2, 2025

(54) VEHICULAR PEDAL ASSEMBLY

(71) Applicant: CTS CORPORATION, Lisle, IL (US)

(72) Inventors: John Clark, Granger, IN (US); Kevin Wolschlager, Elkhart, IN (US)

(73) Assignee: CTS CORPORATION, Lisle, IL (US)

( * ) Notice: Subject to any disclaimer, the term of this patent is extended or adjusted under 35 U.S.C. 154(b) by 0 days.

(21) Appl. No.: 18/525,617

(22) Filed: Nov. 30, 2023

(65) Prior Publication Data
US 2025/0181102 A1    Jun. 5, 2025

(51) Int. Cl.
| | |
|---|---|
| G05G 1/38 | (2008.04) |
| B60K 26/02 | (2006.01) |
| B60T 7/04 | (2006.01) |
| G05G 1/44 | (2008.04) |
| G05G 1/50 | (2008.04) |

(52) U.S. Cl.
CPC ............... *G05G 1/38* (2013.01); *B60K 26/02* (2013.01); *B60T 7/042* (2013.01); *G05G 1/44* (2013.01); *G05G 1/50* (2013.01); *B60Y 2400/301* (2013.01); *B60Y 2410/10* (2013.01); *B60Y 2410/102* (2013.01)

(58) Field of Classification Search
CPC ............................ G05G 1/50; B60Y 2410/102
See application file for complete search history.

(56) References Cited

U.S. PATENT DOCUMENTS

| | | | |
|---|---|---|---|
| 5,233,882 A | 8/1993 | Byram et al. | |
| 5,408,899 A * | 4/1995 | Stewart | F02D 11/02 74/513 |
| 5,768,946 A | 6/1998 | Fromer et al. | |
| 6,089,120 A | 7/2000 | Loechle et al. | |
| 8,011,270 B2 * | 9/2011 | Schlabach | G05G 1/38 74/513 |

(Continued)

FOREIGN PATENT DOCUMENTS

| | | |
|---|---|---|
| DE | 19501680 A1 | 8/1996 |
| DE | 10058561 A1 | 5/2002 |

(Continued)

OTHER PUBLICATIONS

Components Direct, "Plastic Rivets—Ratchet Type," publicly available prior to Nov. 30, 2023, https://www.components-direct.com/component-and-fastener-products/plastic-rivets-ratchet-type.
Hudson Supplies Inc., "Ratchet Rivet 3/4" × 3/4" (20mm) White," webpage available at least as early as Jul. 14, 2015, https://www.hudson4supplies.com/ratchet-rivet-3-4-20mm-white.html.
International Search Report and Written Opinion for Application No. PCT/US2024/057653 dated Mar. 10, 2025 (16 pages).
International Search Report and Written Opinion for Application No. PCT/US2024/057640 dated Mar. 25, 2025 (14 pages).

*Primary Examiner* — Vicky A Johnson
(74) *Attorney, Agent, or Firm* — Michael Best & Friedrich LLP

(57) ABSTRACT

A vehicular pedal assembly includes a pedal including a first support and a second support, a pedal shaft supported by the pedal housing for rotation about a pedal axis, a pedal arm drivably engaged with the pedal shaft to rotate the pedal shaft about the pedal axis, and a position sensor assembly coupled to the pedal shaft and operable to determine a rotational position of the pedal shaft and generate a signal based on the rotational position. The pedal shaft includes a first shaft portion coupled to the first support, a second shaft portion coupled to the second support, and a joint coupling the first shaft portion and the second shaft portion. The joint is positioned between the first support and the second support.

23 Claims, 14 Drawing Sheets

(56) References Cited

U.S. PATENT DOCUMENTS

| | | | |
|---|---|---|---|
| 8,240,230 B2* | 8/2012 | Peniston | ............... G05G 1/38 |
| | | | 324/207.13 |
| 10,994,707 B2 | 5/2021 | Street et al. | |
| 2001/0011487 A1 | 8/2001 | Kojima et al. | |
| 2002/0184749 A1* | 12/2002 | Burgstaler | ............. B60T 7/065 |
| | | | 29/525.01 |
| 2010/0064842 A1 | 3/2010 | Isono | |
| 2016/0054752 A1 | 2/2016 | Willemsen et al. | |
| 2022/0219659 A1 | 7/2022 | Wagner et al. | |
| 2023/0114657 A1 | 4/2023 | Wagner et al. | |
| 2023/0136473 A1 | 5/2023 | Street et al. | |
| 2025/0018904 A1 | 1/2025 | Matsunaga et al. | |

FOREIGN PATENT DOCUMENTS

| | | |
|---|---|---|
| DE | 102010020314 A1 | 11/2011 |
| DE | 102014202267 A1 | 8/2015 |
| EP | 1857909 A2 | 11/2007 |
| JP | 2007132819 A | 5/2007 |
| WO | 2022181326 A1 | 9/2022 |

* cited by examiner

VEHICULAR PEDAL ASSEMBLY

BACKGROUND

The present invention relates to vehicle pedal assemblies and, more specifically, to sensors for determining a position of a pedal.

SUMMARY

Control-by-wire vehicle pedals use sensors that determine the position of the pedal for the purpose of controlling the vehicle. For example, brake-by-wire pedals determine the position of the pedal for the purpose of electro-mechanically applying and releasing the brakes of the vehicle via an actuator not mechanically coupled to the pedal.

In one aspect, the invention provides a vehicular pedal assembly including a pedal housing configured for mounting within a vehicle, the pedal housing including a first support and a second support, a pedal shaft supported by the pedal housing for rotation about a pedal axis, a pedal arm drivably engaged with the pedal shaft and configured to pivot in response to input of a driver to rotate the pedal shaft about the pedal axis, and a position sensor assembly coupled to the pedal shaft and operable to determine a rotational position of the pedal shaft and generate a signal based on the rotational position. The pedal shaft includes a first shaft portion coupled to the first support, a second shaft portion coupled to the second support, and a joint coupling the first shaft portion and the second shaft portion. The joint is positioned between the first support and the second support.

In another aspect, the invention provides a method of assembling a vehicular pedal assembly, the method including mounting a pedal housing within a vehicle, the pedal housing having a first support and a second support, positioning a pedal arm between the first support and the second support, inserting a first shaft portion into a first bore in the first support by moving the first shaft portion along a pedal axis in a first direction, coupling the first shaft portion to the pedal arm through the first bore, inserting a second shaft portion into a second bore in the second support by moving the second shaft portion along the pedal axis in a second direction, opposite the first direction, coupling the second shaft portion to the pedal arm through the second bore, and coupling the first shaft portion to the second shaft portion between the first support and the second support to form a pedal shaft. The pedal shaft supports the pedal arm in the pedal housing for rotation about the pedal axis.

In another aspect, the invention provides a vehicular pedal assembly including a pedal housing configured for mounting within a vehicle, a pedal shaft supported by the pedal housing for rotation about a pedal axis, a pedal arm drivably engaged with the pedal shaft and configured to pivot in response to input of a driver to rotate the pedal shaft about the pedal axis, and a position sensor assembly operable to determine a rotational position of the pedal shaft and generate a signal based on the rotational position. The pedal shaft includes a first shaft portion, a second shaft portion, and a one-way ratchet joint coupling the first shaft portion and the second shaft portion for corotation about the pedal axis.

Other aspects of the invention will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples, instances, and/or aspects of concepts that include the claimed subject matter, and explain various principles and advantages of examples, instances, and/or aspects.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the accompanying drawings. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting. The invention is capable of other embodiments and of being practiced or of being carried out in various ways.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Figure 1:
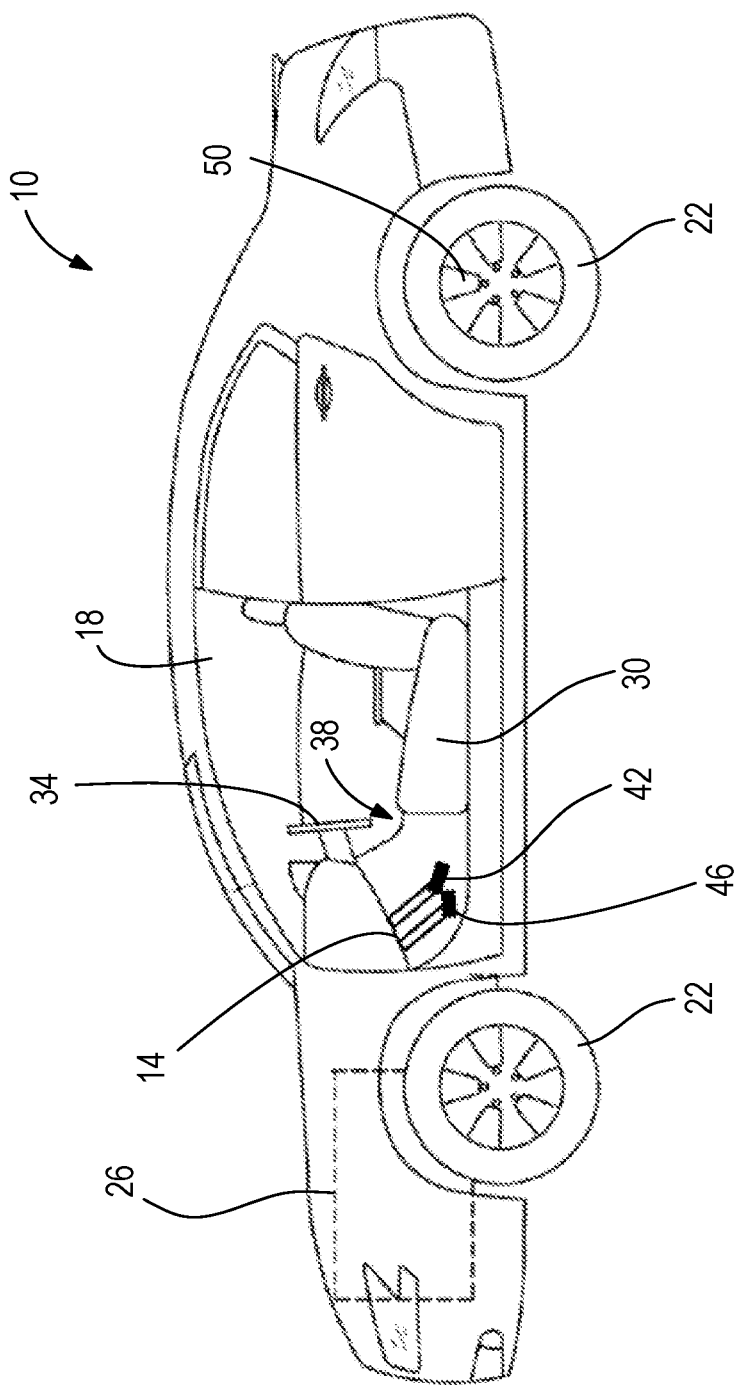
FIG. 1 is a schematic side view of a vehicle with portions of the driver's side removed, the vehicle including a brake pedal and an accelerator pedal.

FIG. 1 illustrates a motor vehicle 10, such as a car, including a body 14 defining an interior compartment 18, a set of wheels 22 coupled to the body 14, and an engine 26 operably coupled to at least one of the front or rear sets of wheels 22 to propel the vehicle 10 to move. The vehicle 10 is controlled by a driver located in a driver's seat 30 in the interior compartment 18. A set of controls is positioned around the driver on a dashboard and in a footwell 38. The controls include, among other things, a steering wheel 34 for steering the direction of the front wheels 22, an accelerator pedal 42 located in the footwell 38, and a brake pedal 46 located adjacent the accelerator pedal 42 in the footwell 38. In a typical vehicle configuration, the accelerator pedal 42 may be positioned to the driver's right of the brake pedal 46. The driver alternately presses the accelerator pedal 42 and the brake pedal 46 to control motion of the car. The accelerator pedal 42 communicates with the engine 26 to provide more torque to the wheels 22. The brake pedal 46 communicates with one or more braking elements 50 (e.g., brake calipers) positioned adjacent one or more of the wheels 22. Each braking element 50 selectively engages a rotor rotatable with the wheel 22 to slow the rotation of the wheel 22 and thus slow the movement of the vehicle 10. In the illustrated embodiment, at least one of the accelerator pedal 42 or the brake pedal 46 includes a control-by-wire system. In the illustrated embodiment, the brake pedal 46 may be brake-by-wire control. Brake-by-wire brake pedals do not mechanically actuate a hydraulic system for braking. Instead, the movement of the brake pedal 46 caused by the driver is measured by a sensor assembly and electronically communicated to a brake controller and one or more remote actuators in control of the braking elements 50 on or adjacent the wheels 22 of the vehicle 10.

FIGS. 2-7 illustrate a vehicular pedal assembly 100 according to a first embodiment. The pedal assembly 100 is a brake-by-wire pedal assembly that may be coupled to the vehicle 10 as the brake pedal 46. In the illustrated embodiment, the pedal assembly 100 is mounted to the body 14 of the vehicle 10 in the footwell 38 in front of the driver's seat 30. In some embodiments, the pedal assembly 100 may additionally or alternatively be used as the accelerator pedal 42 of the vehicle 10. In some embodiments, the pedal assembly 100 may be coupled to the vehicle 10 in different locations based on the type of vehicle 10.

Figure 2:
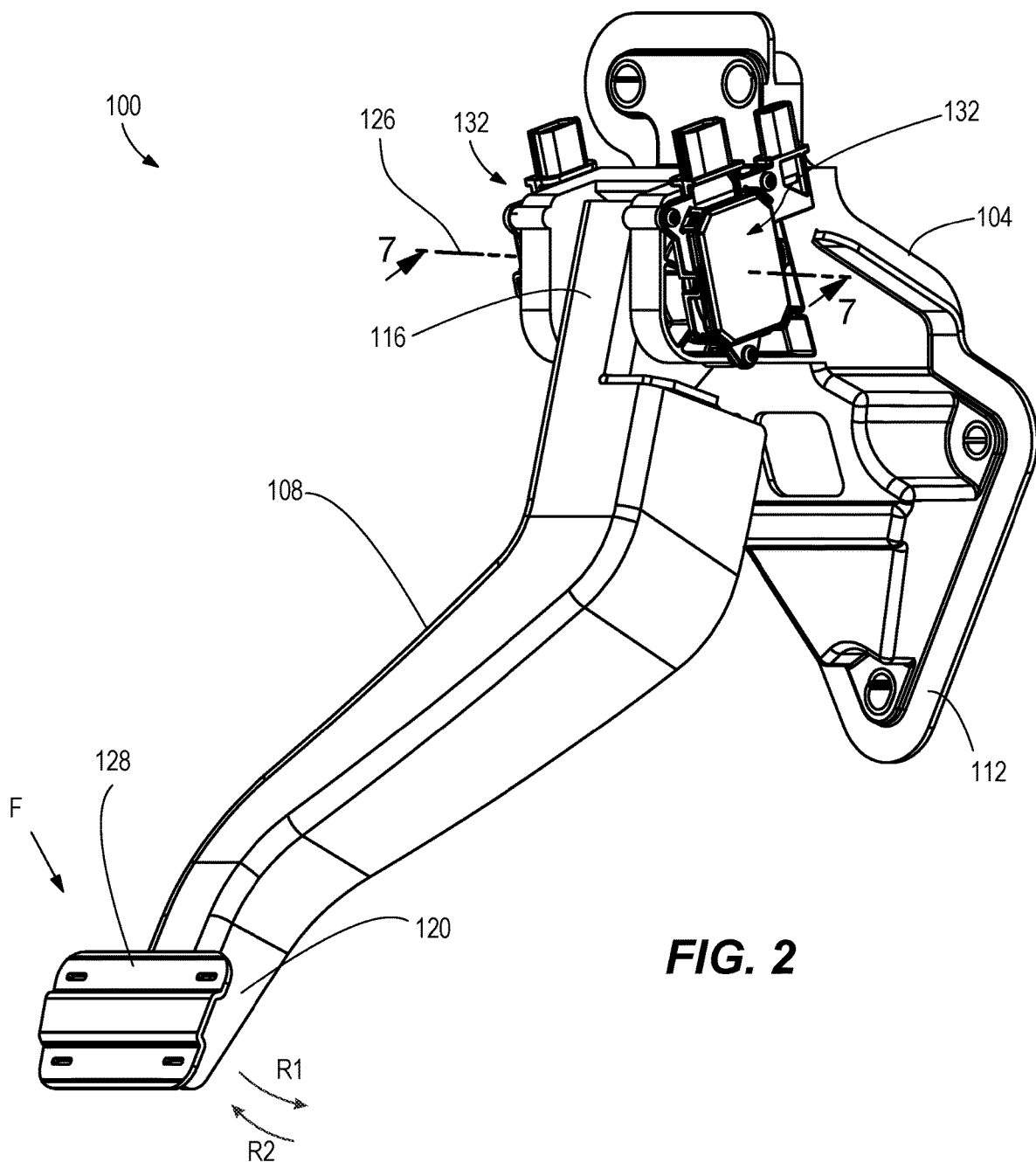
FIG. 2 is a perspective view of a pedal assembly according to one embodiment for use with the vehicle of FIG. 1.
Figure 4:
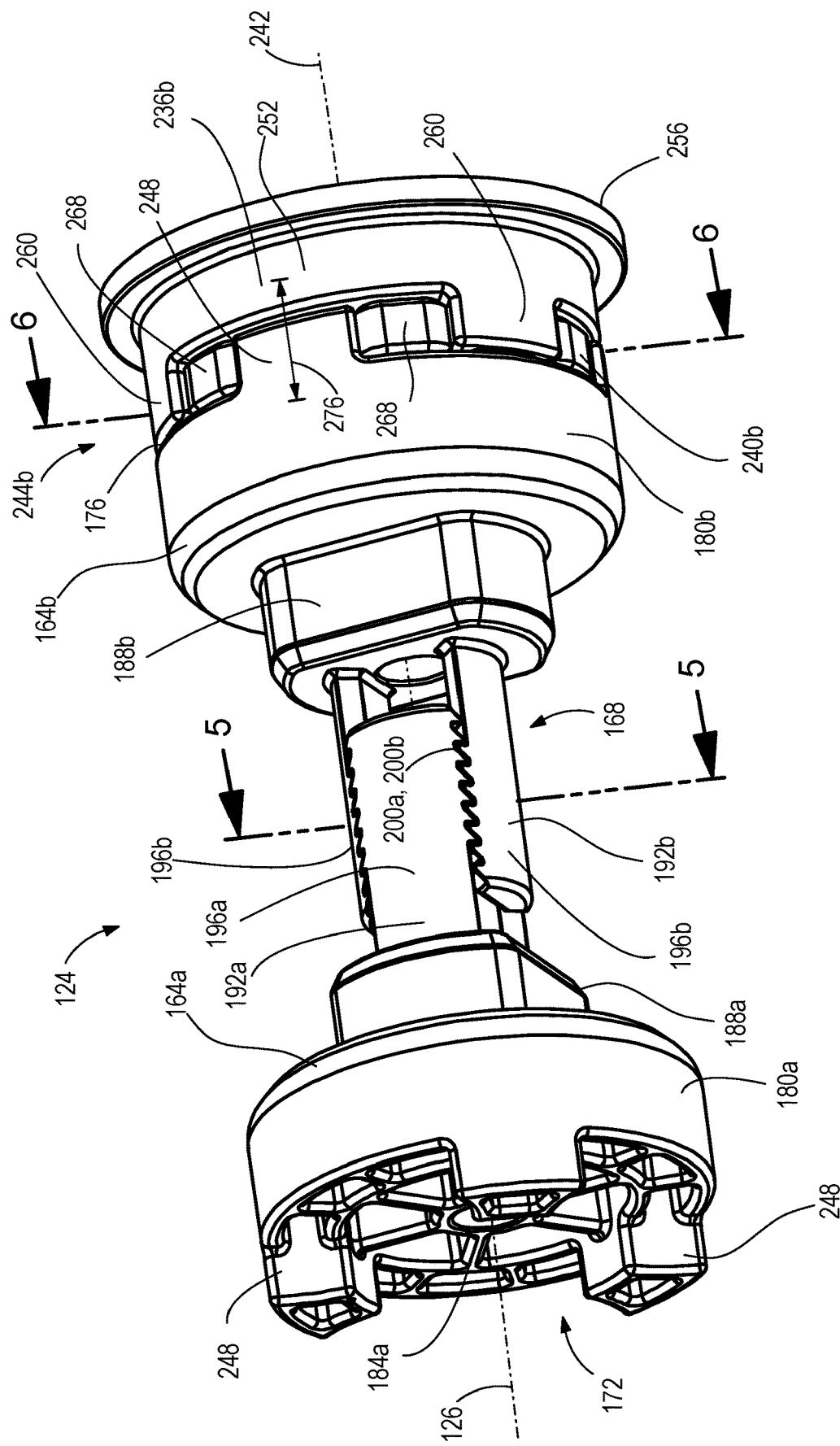
FIG. 4 is a perspective view of a joint of the pedal shaft of FIG. 3, and a coupling between the pedal shaft and a sensor shaft.

As seen in FIG. 2, the pedal assembly 100 includes a pedal housing 104 and a pedal arm 108 extending from the pedal housing 104. The pedal housing 104 may include one or more bracket portions 112 including mounting features for securing the pedal housing 104 in the vehicle 10. For example, the bracket portion(s) 112 may be used to secure the pedal assembly 100 to the body 14 of the vehicle 10 (e.g., at the front bulkhead between the engine bay and the interior compartment 18). The pedal arm 108 extends between an upper end 116 (or first end 116), and a lower end 120 (or second end 120), opposite the upper end 116. The upper end 116 of the pedal arm 108 is coupled to the pedal housing 104 by a pedal shaft 124 (FIG. 4). The pedal shaft 124 is rotatable about a pedal axis 126 and the pedal arm 108 is pivotable relative to the pedal housing 104 between a fully depressed position and a rest position. A biasing member (not shown) may be coupled between the pedal housing 104 and the pedal arm 108 to bias the pedal arm 108 toward the rest position.

A footpad 128 (e.g., a brake footpad), is coupled to the lower end 120 of the pedal arm 108. In some embodiments, the footpad 128 may be integrally formed with the lower end 120 of the pedal arm 108. In other embodiments, the footpad 128 may be a separate component affixed to the lower end 120. The footpad 128 is fixed for movement with the lower end 120 of the pedal arm 108. A driver input force (F) may be applied to the footpad 128, causing the pedal arm 108 to rotate about the pedal axis 126 in a first direction R1, toward the fully depressed position. In other words, the pedal arm 108 pivots in response to an input of the driver on the footpad 128. As discussed, upon removal of the force (F) the biasing member may rotate the pedal arm 108 in a second direction (R2) opposite the first direction. In some embodiments the pedal arm 108 may include at least one curved portion creating an offset in one or multiple directions to increase access to the footpad 128 by the driver. The pedal arm 108 is rotatably fixed to the pedal shaft 124 so that movement of the pedal arm 108 in response to the input force F drives the pedal shaft 124 to rotate about the pedal axis 126.

Figure 3:
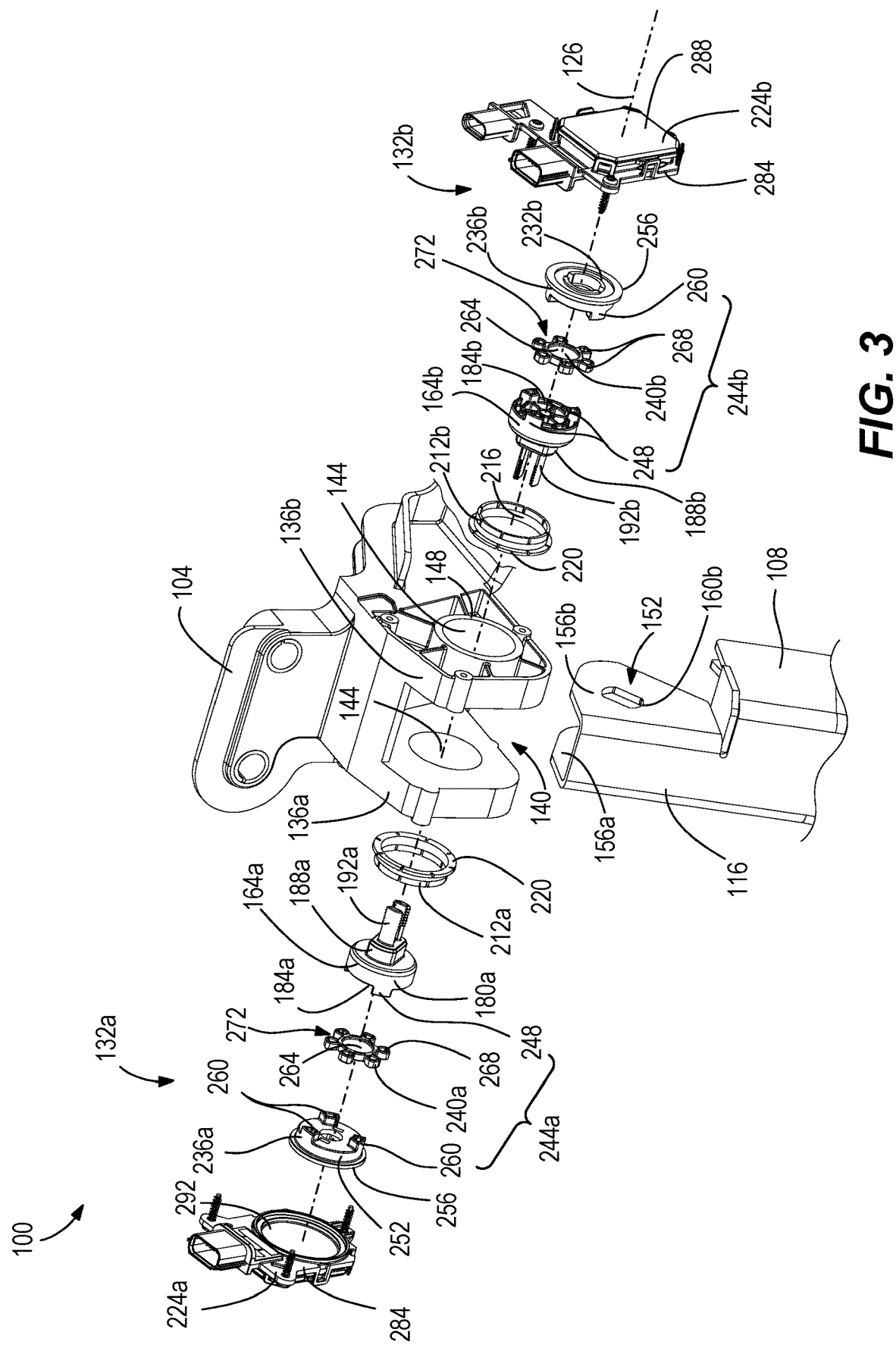
FIG. 3 is an exploded view of the pedal assembly of FIG. 2 including a pedal shaft.

The pedal assembly 100 includes at least one position sensor assembly (PSA) 132 coupled to the pedal housing 104. The PSA 132 determines the travel of the pedal arm 108 between the rest position and the fully depressed position by determining the rotational position of the pedal shaft 124. The PSA 132 generates a signal corresponding to the sensed rotational position of the pedal shaft 124. In some embodiments, the signal generated by the PSA 132 is a preliminary signal that is communicated to a controller which generates a further braking signal to be sent to the braking elements 50. The controller may perform comparisons or calculations on the preliminary signal in order to generate the further braking signal. For example, the controller may compare the current value of the preliminary signal to stored information (e.g., values that correspond to the signals generated by the PSA 132 when the pedal arm 108 is in the rest position and the fully depressed position, respectively). In another example, the controller may compare a current value of the preliminary signal to a prior value of the preliminary signal. As seen in FIG. 3, in the illustrated embodiment, the pedal assembly 100 includes a first PSA 132a and a second PSA 132b coupled to the pedal housing 104 on either side of the pedal arm 108. In some embodiments, the controller may perform comparisons or calculations on the preliminary signal from the first PSA 132a and the preliminary signal from the second PSA 132b to generate the further braking signal. In other embodiments, the controller may be configured to process data from the PSA(s) 132 in other ways.

As mentioned above, the illustrated embodiment includes a pair of PSAs including the first PSA 132a and the second PSA 132b. In some embodiments, the pair of PSAs 132a, 132b are structurally mirror images of each other and may include similar or the same components in a sensor circuit. In some embodiments, the pair of PSAs 132a, 132b are mirror images but include different components in each sensor circuit. In other embodiments, the pair of PSAs 132a, 132b may be both structurally and electronically different.

As seen best in FIG. 3, the pedal assembly 100, with the exception of the bracket portion 112 of the pedal housing 104 and the pedal arm 108, is generally symmetrical such that one side is a mirror image of the other side. Like components use like reference numbers. The instances of the components on the first side of the pedal assembly 100 are labeled with the reference number followed by an 'a' (e.g., 132a) and on the second side of the pedal assembly 100 with the reference number followed by an 'b' (e.g., 132b). Features described with reference to one side of the assembly can generally be assumed to apply to the other side of the assembly unless otherwise specified. Generally, when describing the assembly, "inward" refers to a direction toward the symmetrical center and "outward" refers to a direction toward the edges.

With reference to FIG. 3, the pedal housing 104 incudes a pair of sidewalls 136a, 136b extending parallel to each other and defining a recess 140 therebetween. The pair of sidewalls 136a, 136b (also referred to herein as supports 136a, 136b) are spaced apart by a sufficient distance such that the recess 140 is wider than the upper end 116 of the pedal arm 108. Each sidewall 136a, 136b includes a shaft bore 144 extending from the recess 140 through the sidewall 136a, 136b to a reference surface 148 on the outer side of the sidewall 136a, 136b. The shaft bore 144 of the first sidewall 136a and the shaft bore 144 of the second sidewall 136b extend along and are generally aligned with the pedal axis 126.

The upper end 116 of the pedal arm 108 includes a through bore 152 extending along the pedal axis 126 and having a non-circular profile. In the illustrated embodiment, the upper end 116 includes a pair of flanges 156a, 156b each having a noncircular opening 160a, 160b defining the through bore 152 therebetween. In some embodiments, the upper end 116 of the pedal arm 108 may be solid and the openings 160a, 160b may be positioned at either end of the through bore 152. In the illustrated embodiment, each opening 160a, 160b includes a "double D-shaped" profile (i.e., a circle or oval with parallel flattened edges). In other embodiments, other non-circular profiles may be used (e.g., D-shape, star, keyway, notched circle, square, etc.). In some embodiments, the openings 160a, 160b are identical in shape and orientation. In other embodiments, the opening 160a may have a different profile or different orientation from the opening 160b.

With continued reference to FIG. 3, the pedal assembly 100 includes the pedal shaft 124 supported for rotation about the pedal axis 126. In the illustrated embodiment the pedal shaft 124 is formed from a pair of shaft portions including a first shaft portion 164a and a second shaft portion 164b. In the illustrated embodiment, the first shaft portion 164a and the second shaft portion 164b are first and second halves of the pedal shaft 124 having identical constructions. In other embodiments, the first shaft portion 164a and the second shaft portion 164b have unique constructions. The shaft portions 164a, 164b are coupled by a joint 168 (FIG. 4) to form the pedal shaft 124.

FIG. 4 illustrates the pedal shaft 124 in more detail. The pedal shaft 124 extends between a first end 172 and a second end 176 along the pedal axis 126. The first shaft portion 164a includes a bearing hub 180a having an outer end 184a, a mounting hub 188a extending inwardly from the bearing hub 180a, and a ratchet portion 192a (or a joint portion 192a) extending inwardly from the mounting hub 188a. The second shaft portion 164b similarly includes a bearing hub 180b having an outer end 184b, a mounting hub 188b extending inwardly from the bearing hub 180b, and a ratchet portion 192b extending inwardly from the mounting hub 188b. When assembled, the outer end 184a of the first shaft portion 164a corresponds to the first end 172 of the pedal shaft 124 and the outer end 184b of the second shaft portion 164b corresponds to the second end 176 of the pedal shaft 124. As seen in FIG. 4, the first shaft portion 164a is coupled to the second shaft portion 164b by the joint 168 (also referred to herein as the shaft coupling 168). In the illustrated embodiment, the joint 168 is a snap connection, and more specifically, a ratchet rivet connection. Each ratchet portion 192a, 192b includes a set of ratchet fingers 196a, 196b extending from the mounting hub 188a, 188b. In the illustrated embodiment, the first shaft portion 164a is identical to the second shaft portion 164b and may be rotationally offset to allow the ratchet portion 192a to engage the ratchet portion 192b. For example, in the illustrated embodiment, the second shaft portion 164b is rotated about 90 degrees with respect to the first shaft portion 164a.

Figure 5:
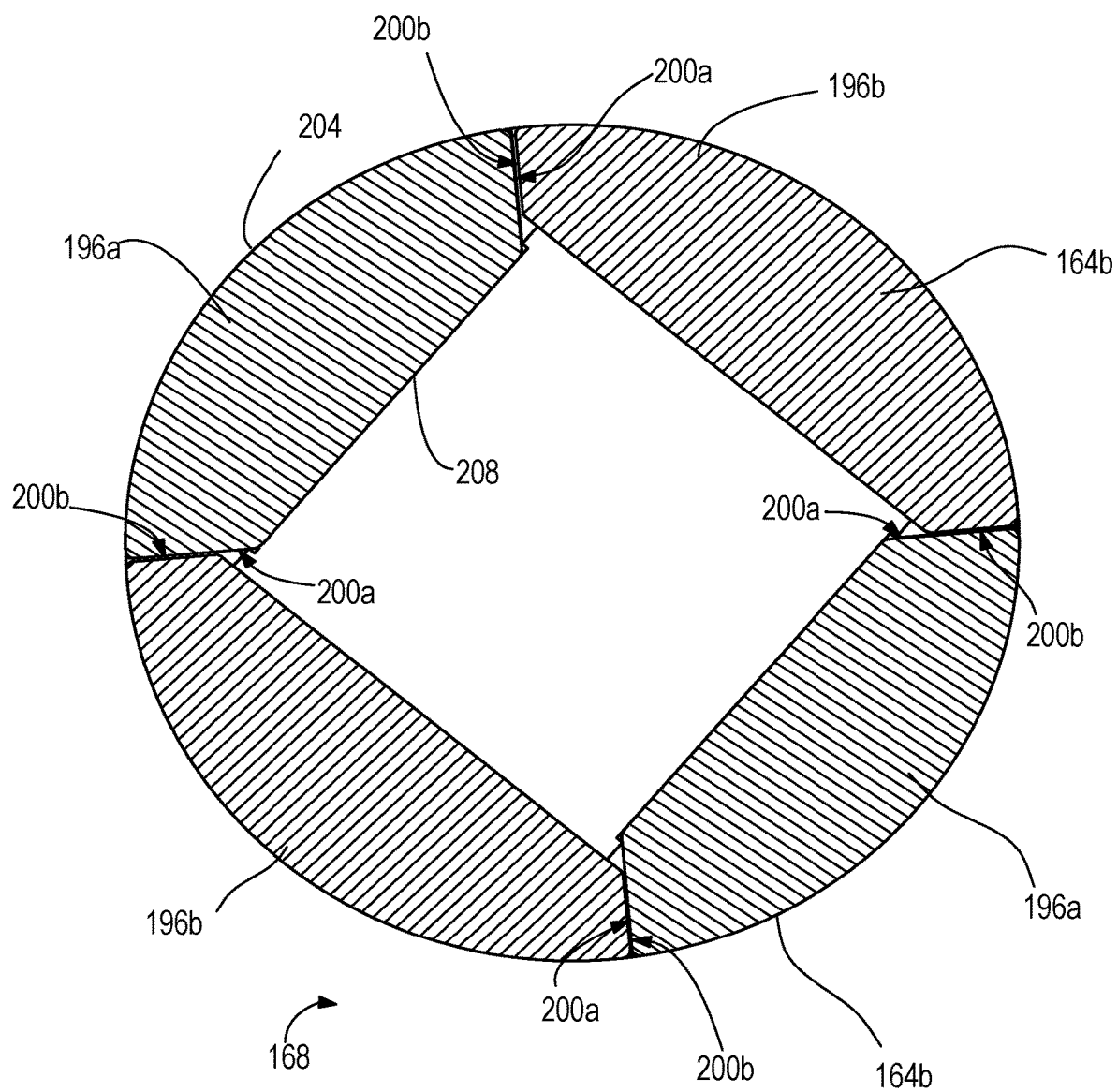
FIG. 5 is a cross-sectional view of the joint of the pedal shaft of FIG. 4, taken along line 5-5 of FIG. 4.

With reference to FIG. 5, in the illustrated embodiment, the ratchet fingers 196a of the first shaft portion 164a are evenly spaced circumferentially about the ratchet portion 192a. In other words, the pair of ratchet fingers 196a are spaced apart by 180 degrees about the pedal axis 126. Each ratchet finger 196a includes a pair of toothed surfaces 200a (also referred to herein as ratchet surfaces) extending lengthwise along the ratchet finger 196a, generally along the pedal axis 126, as seen in FIG. 4. As seen in FIG. 5, looking down the length of the ratchet finger 196a (or at the cross-section of the ratchet portion 192a), each toothed surface 200a is oriented radially with respect to the pedal axis 126. In some embodiments, the ratchet portion 192a may include three or more ratchet fingers 196a. In some embodiments, the toothed surfaces 200a of each ratchet finger 196a may be angularly spaced by approximately 360 degrees divided by twice the number of ratchet fingers 196a, 196b on the ratchet portions 192a, 192b. For example, in the illustrated embodiment, the toothed surfaces 200a of each ratchet finger 196a are spaced by approximately 90 degrees, which is 360 degrees divided by four. In the illustrated embodiment, each ratchet finger 196a includes an arcuate outer surface 204 and a flat lower surface 208 extending between the pair of toothed surfaces 200a. In other embodiments, the upper and lower surfaces of the ratchet fingers 196a may be shaped differently. The ratchet fingers 196b of the second shaft portion 164b are similarly constructed and each of the ratchet fingers 196b includes a pair of toothed surfaces 200b in the same arrangement as the toothed surfaces 200a.

With continued reference to FIG. 5, the joint 168 is formed by engaging the ratchet fingers 196a of the first shaft portion 164a with the ratchet fingers 196b of the second shaft portion 164b. The first ratchet fingers 196a are positioned between the second ratchet fingers 196b, such that each toothed surface 200a is engaged with the toothed surface 200b of the second ratchet finger 196b directly adjacent. As seen best in FIG. 4, the teeth on the toothed surfaces 200a, 200b are shaped to allow axial joining of the shaft portions 164a, 164b (e.g., movement of the shaft portions 164a, 164b along the pedal axis 126 in an inward direction and toward each other), but inhibit axial separation of the shaft portions 164a, 164b (e.g., movement of the shaft portions 164a, 164b along the pedal axis 126 in an outward direction and away from each other). The joint 168 axially secures the first shaft portion 164a and the second shaft portion 164b against separation or uncoupling by the engagement of the toothed surfaces 200a, 200b along the pedal axis 126. Additionally, the joint 168 rotationally couples the first shaft portion 164a and the second shaft portion 164b through the circumferential engagement of the ratchet fingers 196a, 196b seen in FIG. 5. Thus, the first shaft portion 164a and the second shaft portion 164b may be coupled together by the joint 168 to form the pedal shaft 124 that rotates about the pedal axis 126.

With reference to FIG. 4, the mounting hub 188a, 188b of each shaft portion 164a, 164b has a cross-sectional profile that corresponds to the profile of the openings 160a, 160b to the through bore 152 in the pedal arm 108. In the illustrated embodiment, each mounting hub 188a, 188b includes a "double D-shaped" profile corresponding to the "double D-shaped" profile of the openings 160a, 160b. In embodiments where the openings 160a, 160b have different profiles, the mounting hubs 188a, 188b may each have a matching profile with the associated opening 160a, 160b. As seen in FIG. 4, each shaft portion 164a, 164b has a generally stepped configuration. With reference to the first shaft portion 164a, the bearing hub 180a has a generally cylindrical surface and a width (e.g., the largest dimension measured perpendicular to the axis 126) of the bearing hub 180a generally corresponds to a diameter of the surface. The width of the bearing hub 180a is larger than a width (e.g., the largest dimension measured perpendicular to the axis 126) of the mounting hub 188a. Finally, the width of the mounting hub 188a is larger than a width (e.g., the largest dimension measured perpendicular to the axis 126) of the ratchet portion 192a. In embodiments where each ratchet finger 196a, 196b includes the arcuate outer surface 204, the width of the ratchet portion 192a may generally correspond to a diameter of the resulting outer profile (FIG. 5). When assembled, the shaft 124 therefore has an overall 'V' shape or 'hourglass' shape, where the first end 172 and the second end 176 have generally similar widths, which are larger than a width near a center or a middle portion of the shaft 124, adjacent the joint 168.

Returning to FIG. 3, the pedal shaft 124 is supported in the pedal housing 104 for rotation by a pair of bearings 212a, 212b that engage the bearing hubs 180a, 180b of the pedal shaft 124. Each bearing 212a, 212b includes an insert ring 216 for engaging the shaft bore 144 of the respective sidewall 136a, 136b, and a bearing flange 220 that abuts an inner side of the sidewall 136a, 136b to locate the bearing 212a, 212b within the respective shaft bore 144 adjacent the recess 140. As discussed above, the first and second PSAs 132a, 132b have similar or identical constructions in the illustrated embodiment. The first PSA 132a includes a sensor housing 224a, a sensor circuit 228a (FIG. 7) for sensing a target element 232a and generating the preliminary signal, a sensor shaft 236a, and a spacer 240a positioned between the sensor shaft 236a and the pedal shaft 124. The sensor shaft 236a is rotatable with respect to the sensor housing 224a about a sensor axis 242 (FIG. 4). In the illustrated embodiment, the sensor axis 242 is coaxial with the pedal axis 126 when the pedal assembly 100 is assembled (see FIG. 7). In other embodiments, the sensor axis 242 may be offset from and parallel to the pedal axis 126. Similarly, the second PSA 132b includes a sensor housing 224b, a sensor circuit 228b (FIG. 7) that senses a target element 232b, a sensor shaft 236b configured to rotate about a sensor axis 242, and a spacer 240b. The first PSA 132a is coupled to the first end 172 of the pedal shaft 124 (i.e., the outer end 184a of the first shaft portion 164a) to determine a rotational position of the pedal shaft 124 and generate a first preliminary signal based on the sensed position. The second PSA 132b is coupled to the second end 176 of the pedal shaft 124 (i.e., the outer end 184b of the second shaft portion 164b) to determine a rotational position of the pedal shaft 124 and generate a second preliminary signal based on the sensed position. In some embodiments, the PSAs 132a, 132b are both used to add redundancy to the system. In some embodiments, one of the PSAs 132a, 132b may be used as a primary sensing unit and the other of the PSAs 132a, 132b may be used as a backup sensing unit.

The sensor shaft 236a, 236b of each PSA 132a, 132b is fixed for corotation with the pedal shaft 124 by a coupling 244a, 244b formed between the pedal shaft 124 and the sensor shaft 236a, 236b. Each coupling 244a, 244b transmits rotation from the pedal shaft 124 to the respective sensor shaft 236a, 236b to fix the shafts for corotation. Additionally, each coupling 244a, 244b axially isolates the sensor shaft 236a, 236b from movement of the pedal shaft 124 along the pedal axis 126. In other words, each sensor shaft 236a, 236b is translationally decoupled from the pedal shaft 124 by the coupling 244a, 244b formed between the pedal shaft 124 and the sensor shaft 236a, 236b. The axial isolation of the sensor shafts 236a, 236b from the pedal shaft 124 increases the accuracy of the sensor circuits 228a, 228b as described in more detail further below.

Turning to FIG. 4, the coupling 244b between the pedal shaft 124 and the sensor shaft 236b is isolated and illustrated in more detail. While not described in detail, the coupling 244a is substantially the same as the coupling 244b and includes the same components and interactions. Each shaft portion 164a, 164b includes a set of first projections 248 (also referred to herein as drive projections 248) extending axially outward from the outer end 184a, 184b. In the illustrated embodiment, each shaft portion 164a, 164b includes three of the drive projections 248 circumferentially spaced evenly about the pedal axis 126. With reference to FIG. 4, the sensor shaft 236b includes a main hub 252 having a cylindrical outer surface, a flange 256 extending from an outer side of the main hub 252, and a set of second projections 260 (also referred to herein as driven projections 260) axially extending from an inner end of the main hub 252. In the illustrated embodiment, the sensor shaft 236b includes three of the driven projections 260 circumferentially spaced evenly about the sensor axis 242.

Figure 6:
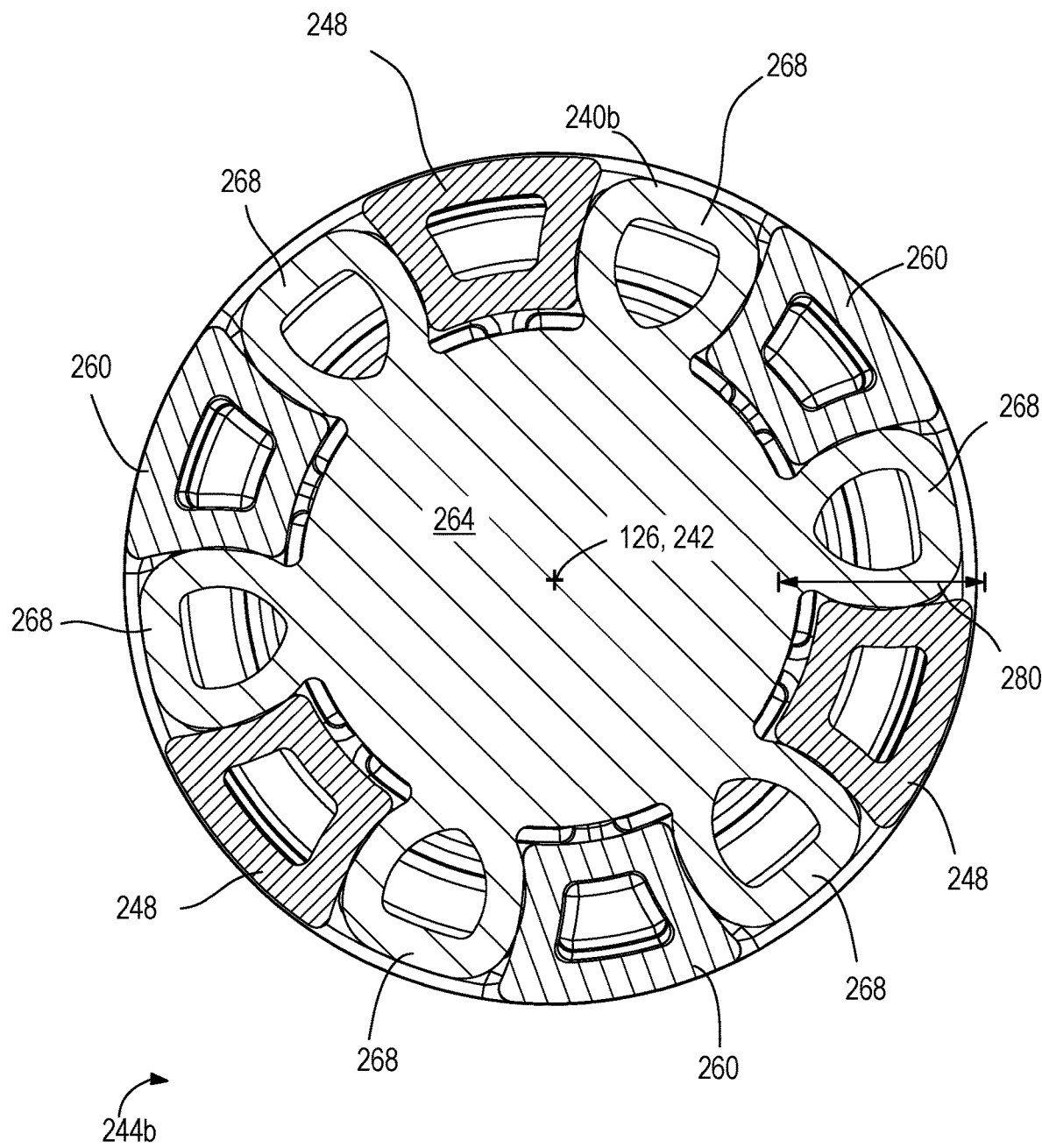
FIG. 6 is a cross-sectional view of the coupling of FIG. 4, taken along the line 6-6 of FIG. 4.

As seen in FIG. 6, a cross section of the coupling 244b illustrates the spacer 240b including an inner hub 264 and a set of spurs 268 extending radially outward from the inner hub 264. The spurs 268 are circumferentially spaced evenly about the inner hub 264. A window 272 (FIG. 3) is formed by the space between each adjacent pair of the spurs 268. In the illustrated embodiment, the spacer 240b includes six of the spurs 268 and six of the windows 272. The spacer 240b is positioned between the sensor shaft 236b and the pedal shaft 124 such that the driven projections 260, the drive projections 248, and the spurs 268 axially overlap. In other words, the driven projections 260, the drive projections 248, and the spurs 268 occupy a common axial span 276 (FIG. 4) along the pedal axis 126 and engage each other to form the coupling 244b. This means that when viewed perpendicular to the pedal axis 126, the drive projections 248, the driven projections 260, and spurs 268 overlap each other in an axial direction along the pedal axis 126 and are visible in a cross-section taken through the common axial span 276, as seen in FIG. 6.

With continued reference to FIG. 6, the cross section of the coupling 244b through the common axial span 276 shows that, when coupled, the drive projections 248 are received in alternating windows 272 of the spacer 240b and the driven projections 260 are received in the remaining windows 272 between the spurs 268. When the coupling 244b is viewed in cross-section, the outer end 184b of the pedal shaft 124, the sensor shaft 236b, and the spacer 240b all have similar sizes and outer diameters such that the drive projections 248, the driven projections 260, and the spurs 268 all radially overlap (i.e., occupy a common radial span 280). The radial overlap and the axial overlap of the drive projections 248, the driven projections 260, and the spurs 268 causes circumferential engagement during rotation and couples the sensor shaft 236b to rotate with the pedal shaft 124. In other words, the coupling 244b between the drive projections 248 and the driven projections 260 transmits rotation from the pedal shaft 124 to the sensor shaft 236*b* through the spacer 240*b*. The sensor shaft 236*b* is driven to corotate with the pedal shaft 124, so that rotation of the sensor shaft 236*b* is simultaneous with and the same amount as the pedal shaft 124. While specific amounts and spacings of projections and spurs are disclosed, in other embodiments, different amounts or configurations of drive projections 248, driven projections 260, and spurs 268 may be used to form the couplings 244*a*, 244*b*. For example, the drive projections 248, the driven projections 260, and the spurs 268 may be unevenly circumferentially spaced with complementary configurations. In another example, the outer end 184*b* includes only two of the drive projections 248, the sensor shaft 236*b* includes only two of the driven projections 260, and the spacer 240*b* includes four of the spurs 268.

In the illustrated embodiment, the spacer 240*b* is formed from a compliant material that has a low stiffness in the axial direction and is axially deformable (e.g., along the pedal axis 126). The compliant material may also have a high resilience such that the spacer 240*b* is biased to return to its original shape. In some embodiments, the spacer 240*b* is formed and shaped so that the rotational stiffness is higher than the axial stiffness. For example, during forming of the spacer 240*b* the structure of the material may be oriented so the lowest stiffness is in the axial direction, or the spacer 240*b* may have increased thicknesses at certain spots to increase the rotational stiffness, or the spacer 240*b* may be assembled in a certain way to increase the rotational stiffness. In some embodiments, the spacer 240*a* may be generally rigid and may not be axially deformable. In some embodiments the coupling 244*a* may be configured differently from the coupling 244*b*. Additional variations may exist and may be incorporated into the design.

Returning again to FIG. 3, each sensor shaft 236*a*, 236*b* is fixed for corotation with the pedal shaft 124 by the couplings 244*a*, 244*b*. Each sensor shaft 236*a*, 236*b* includes the target element 232*a*, 232*b* positioned at an outer side of each main hub 252 and positioned for use with the sensor circuits 228*a*, 228*b*. The target elements 232*a*, 232*b* each rotate with the respective sensor shaft 236*a*, 236*b* to move relative to the adjacent sensor housing 224*a*, 224*b*. In some embodiments, the target elements 232*a*, 232*b* is embedded in the sensor shafts 236*a*, 236*b*. For example, the sensor shaft 236*a*, 236*b* may be formed through a molding process, and the target element 232*a*, 232*b* may be embedded in the main hub 252 during the forming process. In some embodiments, a recess is positioned on the outer side of the main hub 252 and the target element 232*a*, 232*b* is positioned within the recess and carried by the sensor shaft 236*a*, 236*b* to rotate therewith. In other embodiments, the target element 232*a*, 232*b* is otherwise coupled to the main hub 252 of the sensor shaft 236*a*, 236*b*. Each sensor housing 224*a*, 224*b* includes an inner housing 284 and a cover 288 removably coupled to the inner housing 284. The inner housing 284 includes a bearing surface 292 facing inward when assembled.

Figure 7:
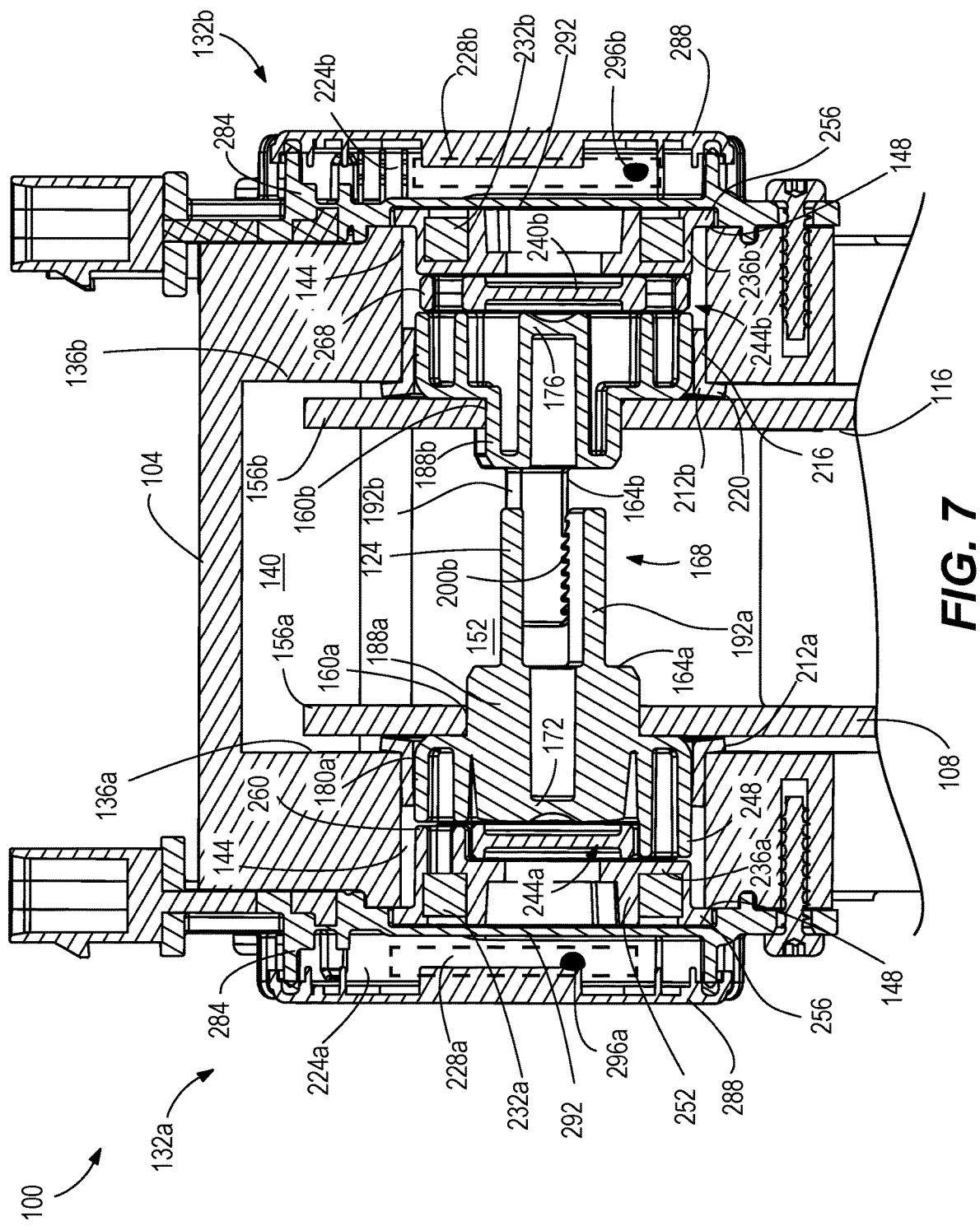
FIG. 7 is a cross-sectional view of the pedal assembly of FIG. 2 taken along the line 7-7, including the pedal shaft and the sensor shaft.

Turning to FIG. 7, the sensor circuits 228*a*, 228*b* each have a sensor 296*a*, 296*b* positioned within the respective inner housing 284. As seen with respect to the first PSA 132*a*, at least a portion of the sensor circuit 228*a* is positioned in the sensor housing 224*a*. For example, a portion of the sensor circuit 228*a* may be positioned on a printed circuit board (PCB) mounted in the inner housing 284. In some embodiments, the sensor circuit 228*a* may include components electrically connected to the PCB but external to the sensor housing 224*a*, such as a vehicle controller, the braking elements 50, etc. The PCB and the sensor 296*a* may be accessible by removing the cover 288 from the inner housing 284. The sensor circuit 228*a* uses the sensor 296*a* to sense the associated target element 232*a* and generate the preliminary signal. The signal varies based on the movement of the target elements 232*a* about the sensor axis 242, as determined by the rotational position of the pedal shaft 124. In the illustrated embodiment, the sensor 296*a* includes a proximity sensor such as a Hall sensor or an inductive sensor. The sensor 296*a* may utilize magnetic or electric fields to determine a position of the target element 232*a*. In embodiments where the sensor 296*a* includes a Hall sensor, the target element 232*a* may include a magnet with rotationally varying flux patterns. In embodiments where the sensor 296*a* includes an inductive sensor, the target element 232*a* may include a metallic element configured to interact with a magnetic field generated by the sensor 296*a*. In other embodiments, the sensor 296*a* may include another type of proximity sensor or a different type of rotational position sensor. The sensor 296*a* may be positioned on the PCB and may be positioned adjacent a side of the bearing surface 292 opposite the target element 232*a* on the sensor shaft 236*a*. In some embodiments the sensor 296*a* may be a dual die sensor and may include multiple sensing elements configured to sense the target element 232*a*. In some embodiments, the sensor shaft 236*a* may include multiple target elements 232*a* and the sensor circuit 228*a* may include multiple sensors 296*a* each associated with one of the multiple target elements 232*a*. The sensor circuit 228*b* of the second PSA 132*b* is generally similar to the sensor circuit 228*a*.

As discussed above, in the illustrated embodiment the first PSA 132*a* and the second PSA 132*b* are structurally mirror images. In some embodiments, the PSAs 132*a*, 132*b* are electronically identical and the sensor 296*a* of the first PSA 132*a* and the sensor 296*b* of the second PSA 132*b* are the same type of sensor. For example, in one embodiment, the first PSA 132*a* and the second PSA 132*b* both include Hall sensors. In other embodiments, the PSAs 132*a*, 132*b* are electronically different and the first PSA 132*a* includes a first type of sensor and the second PSA 132*b* includes a second type of sensor, different from the first type of sensor. For example, in one embodiment, the first PSA 132*a* includes a Hall sensor, and the second PSA 132*b* includes an inductive sensor.

FIG. 7 illustrates a cross section of the pedal assembly 100 with the pedal arm 108, the pedal shaft 124, and the PSAs 132*a*, 132*b* assembled to the pedal housing 104. To assemble the pedal assembly 100, the bearings 212*a*, 212*b* are each coupled to the pedal housing 104 by press-fitting the insert ring 216 into the shaft bore 144 on the respective sidewall 136*a*, 136*b* until the bearing flange 220 abuts the sidewall 136*a*, 136*b*. The upper end 116 of the pedal arm 108 is received in the recess 140 defined between the sidewalls 136*a*, 136*b* such that the through bore 152 (and the openings 160*a*, 160*b*) are generally aligned with the shaft bores 144 along the pedal axis 126.

As discussed above, the pedal shaft 124 is formed by the pair of shaft portions 164*a*, 164*b* coupled by the joint 168. In some embodiments, the shaft portions 164*a*, 164*b* may be part of a set of shaft portions having different features and the shaft portions 164*a*, 164*b* may each be selected based on the needs of the respective side of the assembly (e.g., the diameter of the shaft bore, the type of sensor assembly, the type of coupling between the pedal shaft and sensor shaft, etc.). For example, the first shaft portion 164*a* may be selected based on the situation of the first side of the pedal assembly 100 and the first PSA 132*a*, and the second shaft portion 164*b* may be selected based on the situation of the second side of the pedal assembly 100 and the second PSA 132*b*. The joint 168 allows for greater adaptability of the pedal shaft 124 as compared to a unitary pedal shaft.

Once selected, the first shaft portion 164*a* is inserted into the shaft bore 144 of the first sidewall 136*a* from the outside, adjacent the reference surface 148. The first shaft portion 164*a* is moved along the pedal axis 126 toward the recess 140. As the first shaft portion 164*a* translates, the ratchet portion 192*a* passes through the opening 160*a* and into the through bore 152 of the pedal arm 108. If needed, the first shaft portion 164*a* is rotated to align the mounting hub 188*a* with the opening 160*a* in the pedal arm 108. The mounting hub 188*a* is press fit into the through bore 152 of the pedal arm 108 to couple the first shaft portion 164*a* to the pedal arm 108. The press fit (or interference fit) between the mounting hub 188*a* and the opening 160*a* axially and rotationally couples the first shaft portion 164*a* to the pedal arm 108. The bearing hub 180*a* of the first shaft portion 164*a* is supported in shaft bore 144 extending through the sidewall 136*a* of the pedal housing 104. The bearing hub 180*a* is supported for rotation about the pedal axis 126 through contact with the insert ring 216 of the bearing 212*a*.

Similar to the first shaft portion 164*a*, the second shaft portion 164*b* is inserted into the shaft bore 144 of the sidewall 136*b* and moved along the pedal axis 126 until the ratchet portion 192*b* passes into the through bore 152 of the pedal arm 108. The mounting hub 188*b* is aligned with the opening 160*b* and press fit therein. In the illustrated embodiment, the "double D-shape" of the first opening 160*a* is oriented differently from the "double D-shape" of the second opening 160*b*. Specifically, the first opening 160*a* is offset by 90 degrees from the second opening 160*b*. Therefore, when the mounting hub 188*b* is aligned with the opening 160*b*, the ratchet portion 192*b* is also aligned with the ratchet portion 192*a*. More specifically, the ratchet fingers 196*a* are positioned between the ratchet fingers 196*b* and the toothed surfaces 200*a*, 200*b* of each are engaged, as seen in FIG. 6. As the second shaft portion 164*b* is press fit and travels toward the first shaft portion 164*a*, the teeth on the toothed surfaces 200*a*, 200*b* ramp against each other causing the ratchet fingers 196*a*, 196*b* to deflect slightly radially outward from the pedal axis 126, allowing the second shaft portion 164*b* to continue axially joining with the first shaft portion 164*a* and translating along the pedal axis 126. Thus, the joint 168 is coupled at the same time and by the same motion as the press fit between the shaft portion 164*b* and the pedal arm 108. Once the joint 168 is connected, the teeth on the toothed surfaces 200*a*, 200*b* lock against each other to prevent axial separating of the shaft portions 164*a*, 164*b* (e.g., movement of the shaft portions 164*a*, 164*b* away from each other along the pedal axis 126). The toothed surfaces 200*a*, 200*b* extend along the ratchet fingers 196*a*, 196*b* of each shaft portion 164*a*, 164*b* such that the joint 168 is formed once the shaft portions 164*a*, 164*b* are a first distance apart from each other (e.g., when three teeth of each toothed surface 200*a*, 200*b* are engaged). Once the joint 168 is formed, axial separation is inhibited by the toothed surfaces 200*a*, 200*b*. The toothed surfaces 200*a*, 200*b* extend along the ratchet fingers 196*a*, 196*b* in the direction of the pedal axis 126 such that the shaft portions 164*a*, 164*b* may continue to travel toward each other, engaging more teeth, until the resulting pedal shaft 124 is the correct length, or the remaining components are correctly positioned. For example, the shaft portions 164*a*, 164*b* may be moved toward each other until an end of the bearing hubs 180*a*, 180*b* from which the mounting hubs 188*a*, 188*b* extend abuts the flanges 156*a*, 156*b* of the pedal arm 108. The joint 168 therefore allows the pedal shaft 124 to be used with pedal arms 108 having different spacing between the flanges 156*a*, 156*b* or in pedal housings 104 with different spacing between the sidewalls 136*a*, 136*b*, which increases the adaptability of the pedal shaft 124 compared to a unitary pedal shaft.

The pedal shaft 124 is therefore coupled to the pedal arm 108 and to the pedal housing 104 in order to support the pedal arm 108 for rotation about the pedal axis 126 relative to the pedal housing 104. The pedal arm 108 is drivably engaged with the pedal shaft 124 and the openings 160*a*, 160*b* cooperate with the mounting hubs 188*a*, 188*b* to transmit rotation therebetween. The bearing flange 220 of each of the bearings 212*a*, 212*b* may contact the upper end 116 of the pedal arm 108 to decrease wear as the pedal arm 108 rotates. The pedal shaft 124 is supported with the drive projections 248 at the first end 172 extending within the shaft bore 144 in the first sidewall 136*a*, and the drive projections 248 at the second end 176 extending within the shaft bore 144 in the second sidewall 136*b*. In the illustrated embodiment, the first PSA 132*a* is coupled to first end 172 of the pedal shaft 124 and the second PSA 132*b* is coupled to the second end 176 of the pedal shaft 124.

To assemble the first PSA 132*a* to the pedal housing 104, the spacer 240*a* is positioned adjacent the outer end 184*a* of the first shaft portion 164*a* of the pedal shaft 124, and the drive projections 248 are press fit into alternating windows 272 between the spurs 268, so that the drive projections 248 and the spurs 268 occupy the common axial span 276 along the pedal axis 126. The sensor shaft 236*a* is then positioned in the shaft bore 144 of the first sidewall 136*a*, with the driven projections 260 extending toward the first end 172 of the pedal shaft 124. The sensor shaft 236*a* is moved within the shaft bore 144 toward the first end 172 of the pedal shaft 124 until the driven projections 260 axially overlap with the spurs 268 and the drive projections 248. The driven projections 260 are press fit into the remaining windows 272 between the spurs 268. The drive projections 248, driven projections 260 and spurs 268 are positioned within the common axial span 276 (FIG. 4) of the pedal axis 126. The sensor axis 242 is aligned with the pedal axis 126. The spacer 240*a* is positioned axially between the pedal shaft 124 and the sensor shaft 236*a* and circumferentially between the drive projections 248 and the driven projections 260. The spacer 240*a* transmits rotation between the pedal shaft 124 and the sensor shaft 236*a* and axially isolates the sensor shaft 236*a* from axial movement of the pedal shaft 124.

The sensor shaft 236*a* is inserted into the shaft bore 144 until the flange 256 of the sensor shaft 236*a* abuts the reference surface 148 of the first sidewall 136*a* of the pedal housing 104, limiting axial movement of the sensor shaft 236*a* in the direction toward the pedal arm 108. A small gap is left between the inner ends of the driven projections 260 and the outer end 184*a* of the shaft portion 164*a*. The target element 232*a* is coupled to the outer end of the sensor shaft 236*a*, if not already provided therein. The sensor housing 224*a* is then mounted to the pedal housing 104, for example, by threaded fasteners. The sensor housing 224*a* secures the flange 256 of the sensor shaft 236*a* between the reference surface 148 and the bearing surface 292 of the inner housing 284, limiting axial movement of the sensor shaft 236*a* in the direction away from the pedal arm 108. The sensor shaft 236*a* is therefore axially constrained against the reference surface 148 by the sensor housing 224*a* to axially fix the sensor shaft 236*a* (and thus the target element 232*a*) with respect to the sensor 296*a* of the sensor circuit 228*a*. In the context of this disclosure, axially fixed means that the sensor shaft 236a is inhibited from any excess movement along the pedal axis 126 relative to the sensor housing 224a. In other words, a small amount of axial clearance may exist between the flange 256 and the pedal housing 104 and/or the sensor housing 224a due to manufacturing and assembly tolerances that allow for rotation of the sensor shaft 236a with respect to the sensor housing 224a, however, this axial clearance is minimized. The sensor shaft 236a is therefore axially limited with respect to the pedal housing 104 and the sensor housing 224a. Any movement of the sensor shaft 236a along the pedal axis 126 occurs within a range of axial motion that is smaller than the range of axial motion of the pedal shaft 124 along the pedal axis 126. The sensor 296a and a portion of the sensor circuit 228a (e.g., the PCB) are positioned within the sensor housing 224a. The cover 288 is coupled to the inner housing 284 to enclose the electronic components in the sensor housing 224a. The sensor 296a is supported in the sensor housing 224a adjacent the bearing surface 292, and therefore adjacent the target element 232a.

The second PSA 132b is assembled to the pedal housing 104 in the same way as the first PSA 132a, and the details are not repeated for the sake of brevity. The order in which the assembly steps are disclosed is not intended to limit a method of assembling the pedal assembly 100. The order in which the components are coupled together can be altered without departing from the scope of the disclosure.

During operation of the pedal assembly 100, a driver applies an input force F (FIG. 2) to the footpad 128. The pedal arm 108 is pivoted by the force F and drives the pedal shaft 124 to rotate about the pedal axis 126. Specifically, the press-fit connection between the mounting hubs 188a, 188b and the openings 160a, 160b in the pedal arm 108 transmits the rotation from the pedal arm 108 to the pedal shaft 124. Rotation of the pedal shaft 124 about the pedal axis 126 is transmitted to the sensor shafts 236a, 236b by the couplings 244a, 244b. For the sake of brevity, operation is described with reference to the first side of the assembly 100, however, the second side operates similarly and simultaneously with the first side. The pedal shaft 124 is driven to rotate the drive projections 248 of the first shaft portion 164a about the pedal axis 126. The drive projections 248 are circumferentially engaged with the spurs 268 of the spacer 240a, which are in turn circumferentially engaged with the driven projections 260 on the sensor shaft 236a. The spurs 268 transmit the rotation from the drive projections 248 to the driven projections 260. As discussed above, the spacer 240a has a high rotational stiffness. In the illustrated embodiment, the press-fit between the drive projections 248, the driven projections 260, and the spurs 268 may deform the spurs 268 near the elastic deformation limit. Thus, rotation is transmitted through the spurs 268 without loss due to rotational deformation of the spacer 240a, and the sensor shaft 236a co-rotates with the pedal shaft 124. In other words, the sensor shaft 236a rotates the same amount and at the same time as the pedal shaft 124 so that the rotational position of the sensor shaft 236a is indicative of the rotational position of the pedal shaft 124. The sensor shaft 236a rotates about the sensor axis 242. In the illustrated embodiment, the pedal axis 126 and the sensor axis 242 are co-axial. The rotation of the sensor shaft 236a about the sensor axis 242 causes the target element 232a to rotate with respect to the sensor circuit 228a in the sensor housing 224a. The sensor circuit 228a varies the preliminary signal based on the rotational position of the target element 232a, and by extension the position of the pedal arm 108. A controller processes the preliminary signal from the sensor circuits 228a, 228b and instructs associated elements of the vehicle 10 (e.g., braking elements 50) to activate in response to the movement of the pedal arm 108.

As discussed above, the couplings 244a, 244b axially isolate the PSAs 132a, 132b from the pedal shaft 124, which increases accuracy of the sensor circuits 228a, 228b. For example, sometimes, during operation, the force F applied to the pedal arm 108 may cause the pedal arm 108 to shift laterally (e.g., from side to side) in the recess 140. This translation or lateral displacement of the pedal arm 108 is transmitted to the pedal shaft 124 by the press fit connections between the mounting hubs 188a, 188b and the openings 160a, 160b of the through bore 152. In one example, the pedal shaft 124 is translated along the pedal axis 126 toward the first PSA 132a. The translation of the pedal shaft 124 moves the first end 172 of the pedal shaft 124 toward the sensor shaft 236a. The pedal shaft 124 applies a force along the pedal axis 126 to the spacer 240a, and the spacer 240a deforms (i.e., compresses) in response to absorb the movement of the pedal shaft 124 along the pedal axis 126, axially isolating the sensor shaft 236a. Therefore, the pedal shaft 124 moves along the pedal axis 126 relative to the sensor shaft 236a. In some embodiments, instead of relying on axial deformation of the spacer 240a, the drive projections 248 and/or the driven projections 260 may be slidably coupled to the spacer 240a and configured to slide within the windows 272 such that the pedal shaft 126a is axially translatable with respect to the sensor shaft 236a. Those embodiments may include embodiments where the spacer 240a is generally rigid or embodiments where the spacer 240a is axially deformable. The sensor shaft 236a is isolated from the translation of the pedal shaft 126a. The sensor shaft 236a is further inhibited from moving along the pedal axis 126 and is axially limited by the pedal housing 104 and the sensor housing 224a. The flange 256 of the sensor shaft 236a is axially constrained against the reference surface 148 of the pedal housing 104 by the bearing surface 292 of the sensor housing 224a to axially fix the sensor shaft 236a with respect to the sensor housing 224a. Any axial force applied to the sensor shaft by the spacer 240a is transmitted through the flange 256 and absorbed by the connection between the pedal housing 104 and the sensor housing 224a. Therefore, the sensor shaft 236a (and the target element 232a carried thereon) is axially limited with respect to the sensor housing 224a and the sensor 296a therein, inhibiting any decrease in accuracy of the sensor 296a that would occur if the translation of the pedal shaft 124 were transmitted to the sensor shaft 236a.

Thus, the pedal assembly 100 described herein provides greater precision and accuracy of position sensing. The precision and accuracy of the sensor circuits 228a, 228b in determining the rotational position of the pedal shaft 124 is greatly improved if the proximity of the target element 232a, 232b to the sensor 296a, 296b is only varied by the rotation of the shaft 124 and not by any translational movement. In other words, axial movement of the target elements 232a, 232b (e.g., along the pedal axis 126) can decrease the accuracy of the PSAs 132a, 132b. Therefore, the pedal assembly 100 described herein axially fixes the target element 232a, 232b with respect to the sensor circuit 228a, 228b in the sensor housing 224a, 224b by axially constraining the sensor shaft 236a, 236b with respect to the sensor housing 224a, 224b and the pedal housing 104, and by translationally decoupling (i.e., axially isolating) the sensor shafts 236a, 236b with respect to the pedal shaft 124. Each spacer 240a, 240b, and more broadly each coupling 244a, 244b, is designed to simultaneously i) maintain a connection for corotation and transmit rotation between the pedal shaft 124 and the sensor shaft 236a, 236b, and ii) axially isolate the sensor shaft 236a, 236b by allowing the pedal shaft 124 to move along the pedal axis 126 with respect to the sensor shaft 236a, 236b. Therefore, the proposed design offers improved accuracy and precision in determining the rotational position of the pedal shaft 124.

In the embodiment illustrated in FIGS. 2-7, the sensor shafts 236a, 236b are each axially constrained with respect to the sensor circuits 228a, 228b by constraining the flange 256 of each sensor shaft 236a, 236b against the pedal housing 104 and mounting the sensor housing 224a, 224b to the pedal housing 104 to pin or sandwich the flange 256 between the bearing surface 292 of the adjacent sensor housing 224a, 224b and the reference surface 148 of the respective sidewall 136a, 136b of the pedal housing 104. In other embodiments, the sensor shafts 236a, 236b may be axially constrained or fixed using different means.

Figure 8:
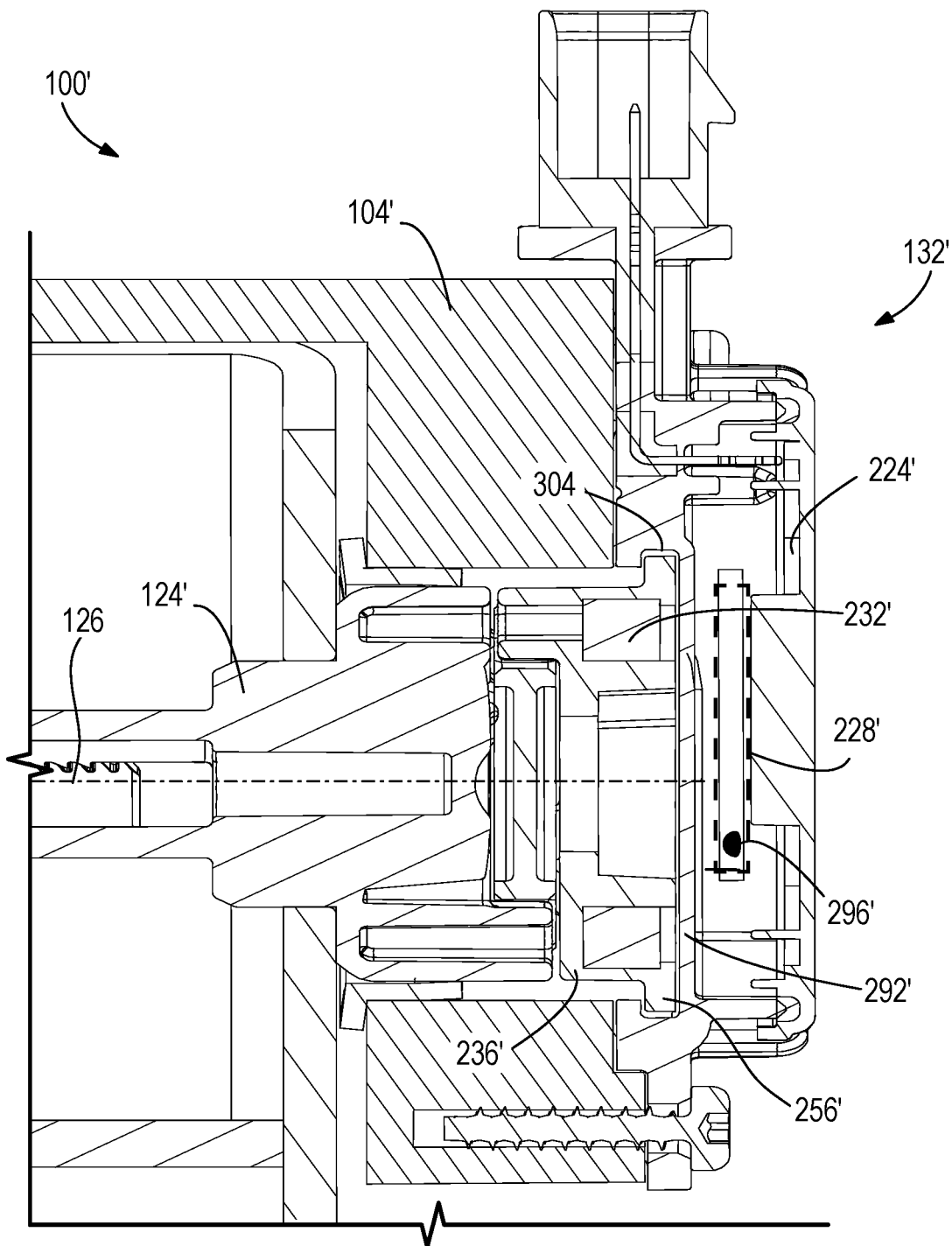
FIG. 8 is a cross-sectional view of an alternate embodiment of a position sensor assembly for use in the pedal assembly of FIG. 2.

For example, FIG. 8 illustrates an alternative embodiment of the pedal assembly 100' including a position sensor assembly 132' in which the sensor shaft 236' (including the target element 232') is axially constrained directly by the sensor housing 224'. The flange 256' of the sensor shaft 236' is rotatably received in a groove 304 (or track) formed partly or entirely by the sensor housing 224' adjacent the bearing surface 292'. The sensor shaft 236' is therefore supported adjacent the sensor circuit 228' and is axially constrained with respect to the sensor circuit 228' and the sensor 296'. The sensor housing 224' is then secured to the pedal housing 104', and the sensor shaft 236' is coupled to the pedal shaft 124' for corotation therewith. The target element 232' is axially fixed with respect to the sensor housing 224' and thus is rotated relative to the sensor circuit 228' without translating axially with respect to the sensor circuit 228'. The sensor circuit 228' generates a signal indicative of the position of the pedal shaft 124' as indicated by the position of the target element 232'. Other embodiments may include still further methods of axially constraining the sensor shaft(s) 236a, 236b and target element(s) 232a, 232b with respect to the sensor circuit(s) 228a, 228b.

With reference back to the pedal assembly 100 of FIGS. 2-7, and as discussed above, the jointed shaft design allows for greater adaptability and modularity, allowing the pedal shaft 124 to be easily customized based on the specific requirements of the situation. Additionally, the pedal shaft 124 of the pedal assembly 100 illustrated in FIGS. 2-7 offers increased ease of installation compared to previous pedal assembly designs. Previous designs included a single unitary shaft (often carrying one or more sensor targets) for mounting the pedal arm to the housing, however, such designs often required difficult or complex press fits through multiple components in order to properly support the pedal arm in the housing. One common issue results from the differing widths of the various bores. For example, a press fit may be more secure when made with a smaller opening, however, rotational support of a shaft may be easier when made with a larger opening, meaning that the portions of the shaft configured to be supported in the housing is often wider than the portion between the supports which is configured to couple (e.g., via press fit) to the pedal shaft. Complex geometry or press-fits may be required to properly support and couple the pedal arm to the housing when using a standard unitary pedal shaft design.

In the embodiment illustrated in FIGS. 2-7, the joint 168 in the pedal assembly 100 allows each of the shaft portions 164a, 164b of the pedal shaft 124 to be separately coupled through the outside of the pedal housing 104 and press fit into the openings 160a, 160b of the through bore 152. The bearing portions 180a, 180b, which are the wider portions of the shaft, are supported in the housing 104 on both sides of the pedal arm 108, and the mounting hubs 188a, 188b, which are narrower than the bearing portions 180a, 180b, are press fit in the openings 160a, 160b and coupled to the pedal arm 108. The joint 168 is easily connected within the through bore 152 without additional tools, components, or actions. The axial movement needed to join the shaft portions 164a, 164b and couple the joint 168 occurs as part of the process of press fitting the shaft portions 164a, 164b to the pedal arm 108. Therefore, the shaft 124 is formed from the shaft portions 164a, 164b during assembly without adding a separate motion or step to the process. The ratchet rivet style of the joint 168 allows each shaft portion 164a, 164b to be formed as a single piece and the joint 168 does not require additional components or pre-assembly of any parts. The joint 168 of the illustrated embodiment offers additional simplicity since the first shaft portion 164a and the second shaft portion 164b are identical, meaning the number of distinct components in the pedal assembly 100 is not increased by replacing the unitary shaft with the pedal shaft 124 with the joint 168.

In addition to the case of assembly, the joint 168 provides secondary or backup locating features that axially and rotationally fix the first shaft portion 164a with respect to the second shaft portion 164b. In the pedal assembly 100 described herein, the shaft portions 164a, 164b are each separately press fit to the pedal arm 108, and therefore the shaft portions 164a, 164b are each axially fixed with respect to the pedal arm 108 and therefore to each other. Additionally, each shaft portion 164a, 164b is separately driven to rotate about the pedal axis 126 by the engagement between the openings 160a, 160b and the mounting hubs 188a, 188b, resulting in simultaneous rotation of the shaft portions 164a, 164b. The press fits may serve as the primary system for locating (e.g., fixing the location of) the shaft portions 164a, 164b with respect to the pedal arm 108 and to each other. However, even without the press fit between the shaft portions 164a, 164b and the pedal arm 108, the joint 168 acts as a backup locating system for maintaining the shaft portions 164a, 164b with respect to each other. Therefore, in assemblies where only one shaft portion 164a, 164b is press fit (or otherwise axially and rotationally fixed) with the pedal arm 108, both shaft portions 164a, 164b are still rotated and translated simultaneously. Rotationally locating the shaft portions 164a, 164b with respect to each other allows the shaft portions 164a, 164b to act together as the pedal shaft 124 so that in embodiments with both the first PSA 132a and the second PSA 132b, the sensor shafts 236a, 236b are driven to rotate by the pedal shaft at the same time and to the same degree, resulting in consistent measuring between the first PSA 132a and the second PSA 132b.

For example, if during operation, only the first shaft portion 164a is axially fixed to the pedal arm 108 (e.g., by the press fit between the mounting hub 188a and the opening 160a), and the second shaft portion 164b attempts to axially separate from (i.e., move axially outward with respect to) the first shaft portion 164a, the joint 168 would inhibit axial separation. Specifically, the toothed surfaces 200a of the ratchet fingers 196a would engage the toothed surfaces 200b of the ratchet fingers 196b and would lock against each other, stopping movement of the toothed surfaces 200a, 200b relative to each other, and thereby inhibiting axial separation of the shaft portions 164a, 164b. Thus, if the pedal arm 108 translates laterally, as discussed above, the translation would be transmitted through the press fit to the first shaft portion 164a and then through the joint 168 to the second shaft portion 164b. The translation is then inhibited from transmitting to the sensor shafts 236a, 236b by the couplings 244a, 244b. Axially locating the shaft portions 164a, 164b prevents the pedal shaft 124 from changing in length, which may adversely affect the spacing in the couplings 244a, 244b and the effectiveness of the spacers 240a, 240b. Additionally, if only the first shaft portion 164a is rotationally fixed with the pedal arm 108 (e.g., by the press fit between the mounting hub 188a and the opening 160a), and the pedal arm 108 is rotated about the pedal axis, then the pedal arm 108 drives the first shaft portion 164a to rotate about the pedal axis 126, and the joint 168 transmits the rotation from the first shaft portion 164a to the second shaft portion 164b. Specifically, the circumferential engagement of the toothed surfaces 200a, 200b due to the axial and radial overlap of the ratchet fingers 196a, 196b transmits the rotation between the shaft portions 164a, 164b. Rotation of the shaft portions 164a, 164b is transmitted to the sensor shafts 236a, 236b through the couplings 244a, 244b and both of the sensor circuits 228a, 228b can detect the resulting movement of the target elements 232a, 232b and generate the signal indicating the movement of the pedal shaft 124 and pedal arm 108. Thus, rotationally locating the shaft portions 164a, 164b with respect to each other ensures that the pedal shaft 124 can be consistently sensed by either of the sensor circuits 228a, 228b.

As discussed above, in the pedal assembly 100 the press fits between the mounting hubs 188a, 188b and the openings 160a, 160b are designed to act as the primary locating feature to determine the positioning of the shaft portions 164a, 164b with respect to each other, and the joint 168 is used as a backup system to support the press fits. In some embodiments, the backup locating features of the joint 168 may be used alongside a detection system or regular maintenance that would monitor the primary locating system, or in other words, ensure both shaft portions 164a, 164b are press fit to the pedal arm 108.

Overall, the joint 168 offers the pedal shaft 124 increased adaptability and ease of assembly without increasing the complexity of the design or negatively impacting the function thereof and offers support to the primary locating features (e.g., the press fits of the shaft portions 164a, 164b).

In the pedal assembly 100, as illustrated in FIGS. 2-7, the pedal shaft 124 includes both the joint 168 and at least one isolating coupling 244a, 244b for connecting to the sensor shaft 236a, 236b. However, in other embodiments a pedal assembly may include only one of the joint or the coupling(s). For example, a pedal assembly may include a unitary pedal shaft configured to couple to at least one position sensor assembly by an axially isolating coupling. Alternately, a pedal assembly may include a jointed pedal shaft having portions of the position sensor assembly(ies) integrated with the pedal shaft (for example, the pedal assembly 800 illustrated in FIGS. 13-15). The features are therefore independent, and each offer their own advantages, which may be increased when combined into a single assembly, as shown in the pedal assembly 100 shown in FIGS. 2-7.

Figure 9:
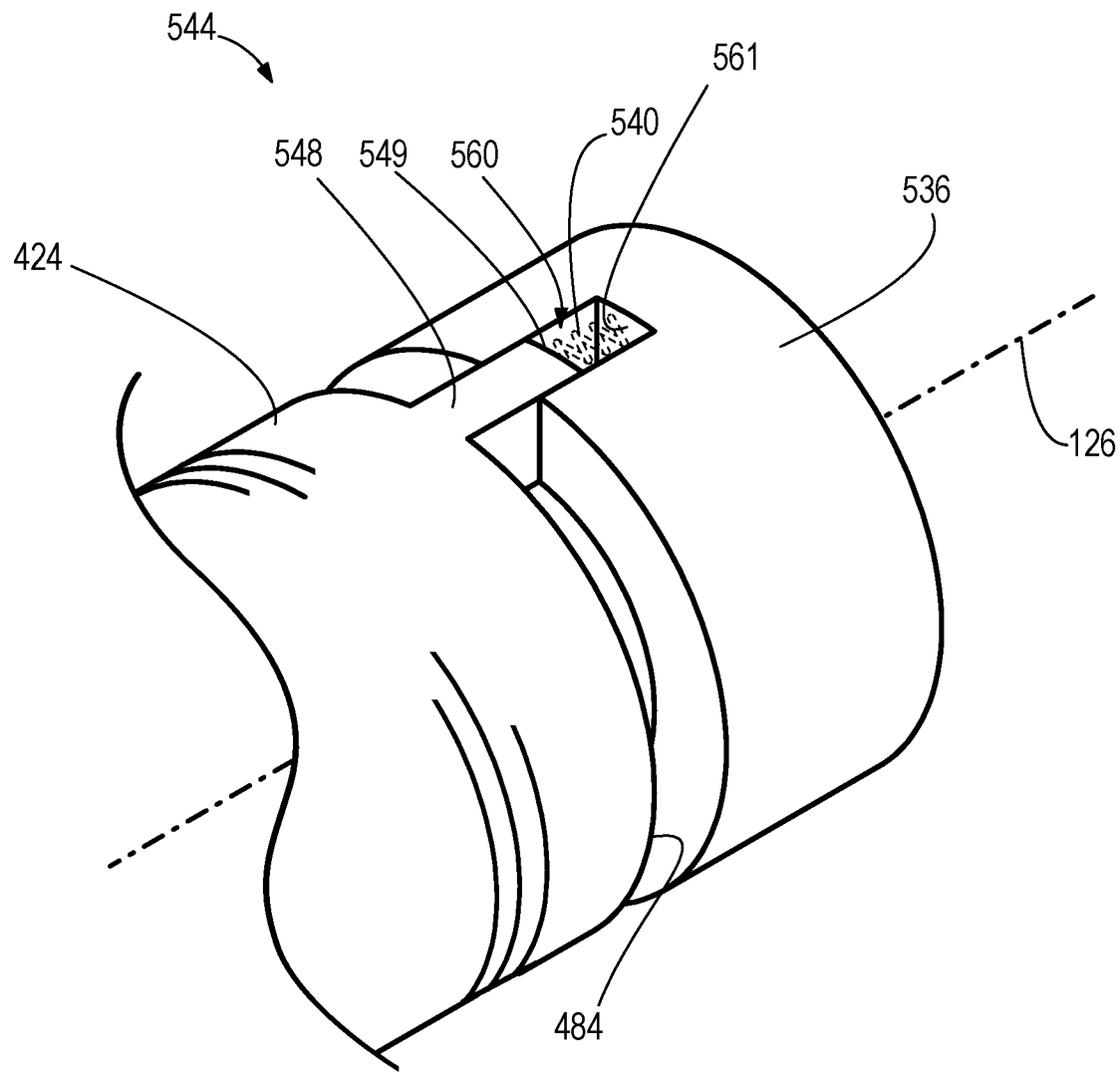
FIG. 9 is a perspective view of an alternative coupling between the pedal shaft and the sensor shaft of the pedal assembly of FIG. 2 according to a first embodiment.

FIG. 9 illustrates a first embodiment of an alternate coupling 544 between a sensor shaft 536 and a pedal shaft 424. The alternate coupling 544 may be incorporated into the pedal assembly 100 in place of one or both of the couplings 244a, 244b. The alternate coupling 544 transmits rotation between the sensor shaft 536 and the pedal shaft 424 and allows for axial movement of the pedal shaft 424 along the pedal axis 126. In the illustrated embodiment, the coupling 544 includes a pair of drive projections 548 extending from an outer end 484 of the pedal shaft 424. The drive projections 548 are slidably received in a set of slots 560 on the sensor shaft 536. In the illustrated embodiment, the pedal shaft 424 includes the projections 548 and the sensor shaft 536 includes the slots 560, however, in other embodiments this may be reversed and the pedal shaft 424 may include slots for receiving the projections of the sensor shaft 536. The circumferential engagement of the projections 548 in the slots 560 transmits rotation between the pedal shaft 424 and the sensor shaft 536. The drive projections 548 are axially slidable within the slots 560 to allow the pedal shaft 424 to translate relative to the sensor shaft 536 along the pedal axis 126. Biasing members 540 may be positioned axially between an end surface 549 of the drive projections 548 and a rear wall 561 of the slots 560 to bias the pedal shaft 424 and the sensor shaft 536 apart. When the coupling 544 is incorporated in a pedal assembly, the biasing members 540 of the coupling 544 retain the target element (not shown) on the end of the sensor shaft 536 in close axial proximity to the sensor circuit in the sensor housing (not shown). As mentioned above, the alternate coupling 544 may be used in place of the couplings 244a, 244b between one or both of the sensor shafts 236a, 236b and the pedal shaft 124. In some embodiments, the shaft portions 164a, 164b may be selected based on the desired coupling and the configuration of the sensor shaft.

Figure 10:
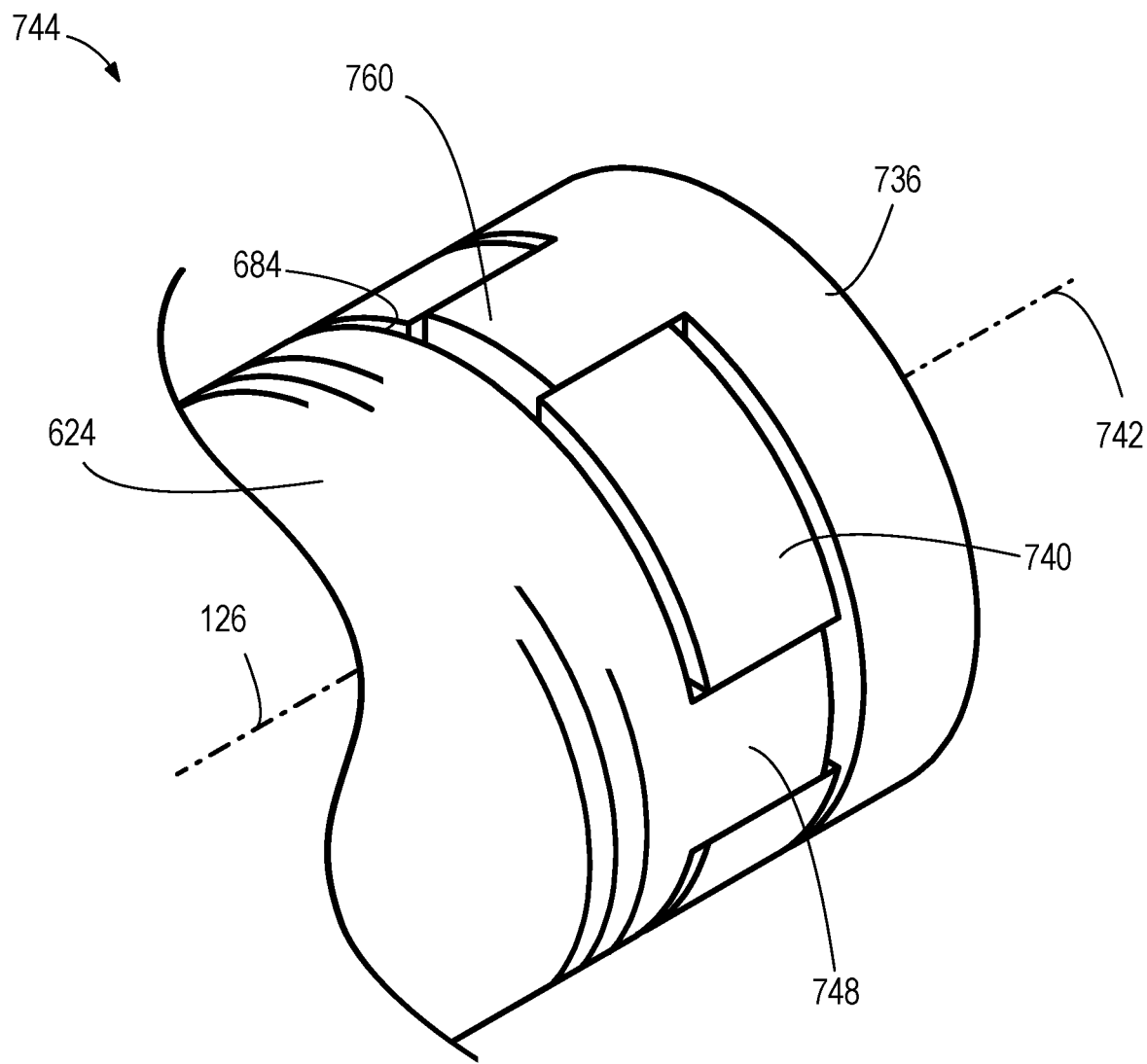
FIG. 10 is a perspective view of an alternative coupling between the pedal shaft and the sensor shaft of the pedal assembly of FIG. 2 according to a second embodiment.
Figure 11:
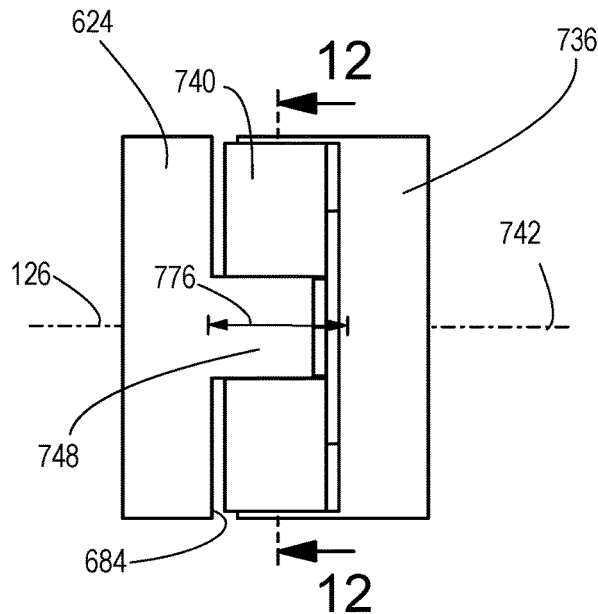
FIG. 11 is a side view of the coupling of FIG. 10.
Figure 12:
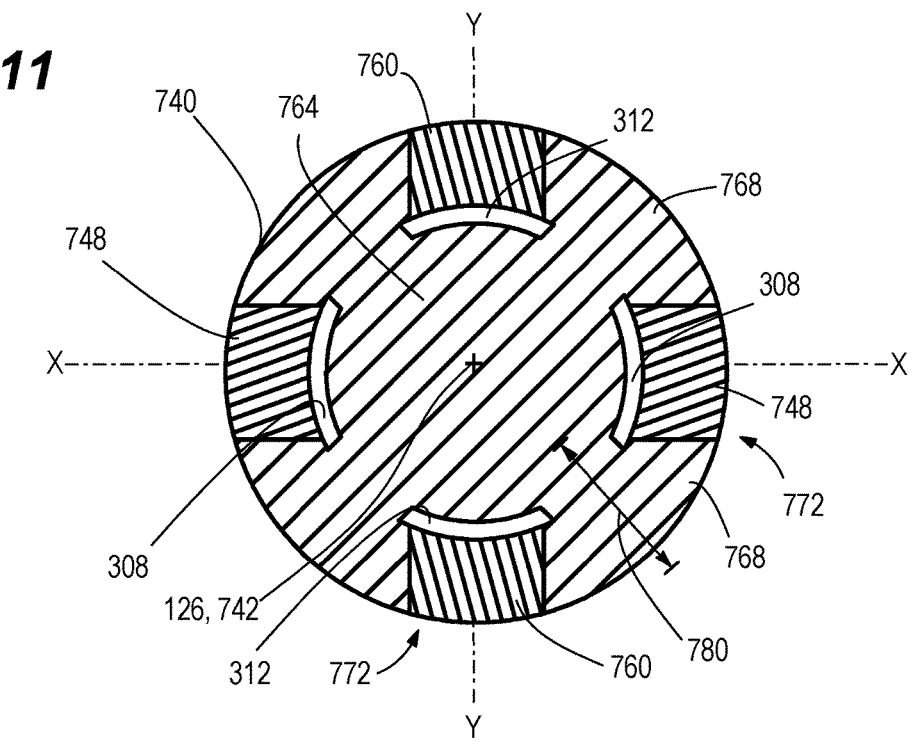
FIG. 12 is a cross-sectional view of the coupling of FIG. 10 taken along line 12-12 of FIG. 11.

FIGS. 10-12 illustrate a second embodiment of an alternate coupling 744. The alternate coupling 744 can be incorporated into the pedal assembly 100 and replace one or both of the couplings 244a, 244b. The coupling 744 connects the sensor shaft 736 with the pedal shaft 624 and transmits rotation therebetween. The coupling 744 also allows movement of the pedal shaft 624 with respect to the sensor shaft 736. In the illustrated embodiment, the pedal shaft 624 is rotatable about a pedal axis 126. The sensor shaft 536 is rotatable about a sensor axis 742. The coupling 744 transmits rotation of the pedal shaft 624 about the pedal axis 126 and drives the sensor shaft 736 to rotates about the sensor axis 742. The coupling 744 isolates the sensor shaft 736 from axial and radial movement of the pedal shaft 624. The pedal shaft 624 includes a pair of drive projections 748 extending from an outer end 684. The sensor shaft 736 similarly includes a pair of driven projections 760 axially extending along the sensor axis 742. The coupling 744 includes a spacer 740 having an inner hub 764 (FIG. 12), four spurs 768 extending radially outward from the inner hub 764, and four windows 772 positioned circumferentially between the spurs 768. When the pedal shaft 624 and sensor shaft 736 are coupled, the spurs 768 are interspersed between the drive projections 748 and driven projections 760. In other words, the drive projections 748 and driven projections 760 are received in alternating windows 772 of the spacer 740.

With reference to FIG. 11, in the illustrated embodiment, the spacer 740 is configured to axially isolate the sensor shaft 736 from the pedal shaft 624 in a similar way to the spacer 240b of the coupling 244b shown in FIGS. 4 and 6. The spacer 740 is positioned axially between the pedal shaft 624 and the sensor shaft 736. The spacer 740 may be formed of a compliant material and may be deformable in an axial direction (e.g., along the pedal axis 126). In an axially neutral position, shown in FIG. 11, the driven projections 760 may be spaced from the outer end 684 of the pedal shaft 624, and therefore the pedal shaft 624 is able to slide with respect to the sensor shaft 736 in either direction from the neutral position along the pedal axis 126. The translation of the pedal shaft 624 toward the sensor shaft 736 is absorbed by the spacer 740 and is not transmitted to the sensor shaft 736. The spacer 740 therefore axially isolates the sensor shaft 736 from the pedal shaft 624. The spurs 768, the drive projections 748, and the driven projections 760, are all positioned in a common axial span 776 along the pedal axis 126 and a common radial span 780 (FIG. 12) such that the spurs 768, the drive projections 748, and the driven projections 760 are all circumferentially engaged to transmit rotation.

With reference to FIG. 12, the sensor shaft 736 and the pedal shaft 624 are each radially movable with respect to each other and with respect to the spacer 740. As discussed above, the drive projections 748 and driven projections 760 are received in the windows 772, and more specifically, may be press fit with the spacer 740 to position the components in the common axial span 776 and create circumferential engagement therebetween. In a radially neutral position (also referred to as an aligned position), shown in FIG. 12, the sensor axis 242 is aligned with the pedal axis 126. A pair of first gaps 308 are formed between the inner hub 764 and each of the drive projections 748. The drive projections 748 are directly opposite each other across the pedal axis 126, therefore, the pair of first gaps 308 are similarly formed in windows 772 directly opposite each other. The pair of first gaps 308 are aligned along a first axis (e.g., the X-axis of FIG. 12). Thus, one of the pair of first gaps 308 is adjacent the inner hub 764 in a first direction along the X-axis (a first radial direction) and the second of the pair of first gaps 308 is adjacent the inner hub 764 in a second direction along the X-axis, opposite the first direction (a third radial direction). The pedal shaft 624 is able to radially deflect and move along the X-axis in the first and second directions relative to the spacer 740 (and therefore the sensor shaft 736), such that the pedal axis 126 is offset from the sensor axis 742 creating a misalignment of the pedal shaft 624 and the sensor shaft 736. Similarly, a pair of second gaps 312 is formed adjacent the inner hub 764 along a second axis (e.g., the Y-axis of FIG. 12), between the inner hub 764 and each of the driven projections 760. The pedal shaft 624 and the spacer 740 are movable relative to the sensor shaft 736 in a first direction along the Y-axis (a second radial direction) and in a second direction along the Y-axis, opposite the first direction (a fourth radial direction), such that the pedal axis 126 is offset from the sensor axis 742 creating a misalignment of the pedal shaft 624 and the sensor shaft 736.

The gaps 308, 312 are smaller than a radial width of the projections 748, 760 such that at least a portion of the projections 748, 760 remains radially overlapped with the spurs 768. In other words, the drive projections 748, the driven projections 760, and the spurs 768 remain within the common radial span 780 during misalignment. The coupling 744 therefore maintains the circumferential engagement within the common axial span 776 that transmits rotation, even when the pedal axis 126 is offset from the sensor axis 742. The coupling 744 maintains a connection for corotation between the pedal shaft 624 and the sensor shaft 736 regardless of axial or radial movement of the pedal shaft 624 relative to the sensor shaft 736. In other words, the coupling 744 is able to tolerate misalignment between the pedal shaft 624 and the sensor shaft 736 and continue to transmit rotation therebetween. The sensor shaft 736 may be radially constrained with respect to the sensor housing such that during operation, the pedal shaft 624 may deflect radially and move radially along the X and Y axes relative to the sensor shaft 736 and only rotation of the pedal shaft 624 is transmitted to the sensor shaft 736, maintaining a connection for corotation with the pedal shaft 624 during misalignment.

Thus, when the coupling 744 is incorporated into a pedal assembly, the sensor shaft 736 maintains alignment and rotates about the sensor axis 742 with respect to the sensor housing and the target element (coupled to the sensor shaft 736) does not move axially or deflect radially with respect to the sensing circuit (not shown). In some embodiments, the gaps 308, 312 may be used alongside or replaced by a low radial stiffness of the spacer 740. For example, one of the projections 748 may move through one of the first gaps 308 to allow radial deflection of the pedal shaft 624, and/or the projection 748 may engage the inner hub 764 adjacent the window 772 and the inner hub 764 may deform to allow for radial deflection of the pedal shaft 624 with respect to the sensor shaft 736. The directions of movement are discussed with reference to an X-Y coordinate system as applied to FIG. 12. The references to X and Y axes are not intended to limit the discussed movement to horizontal and vertical axes, and the coordinate system shown in FIG. 12 would rotate along with the coupling 744. As discussed above, the coupling 744 may replace either coupling 244a, 244b in the pedal assembly 100 and the shaft portions 164a, 164b may be selected based on the desired coupling and configuration of the sensor shaft 736.

Figure 13:
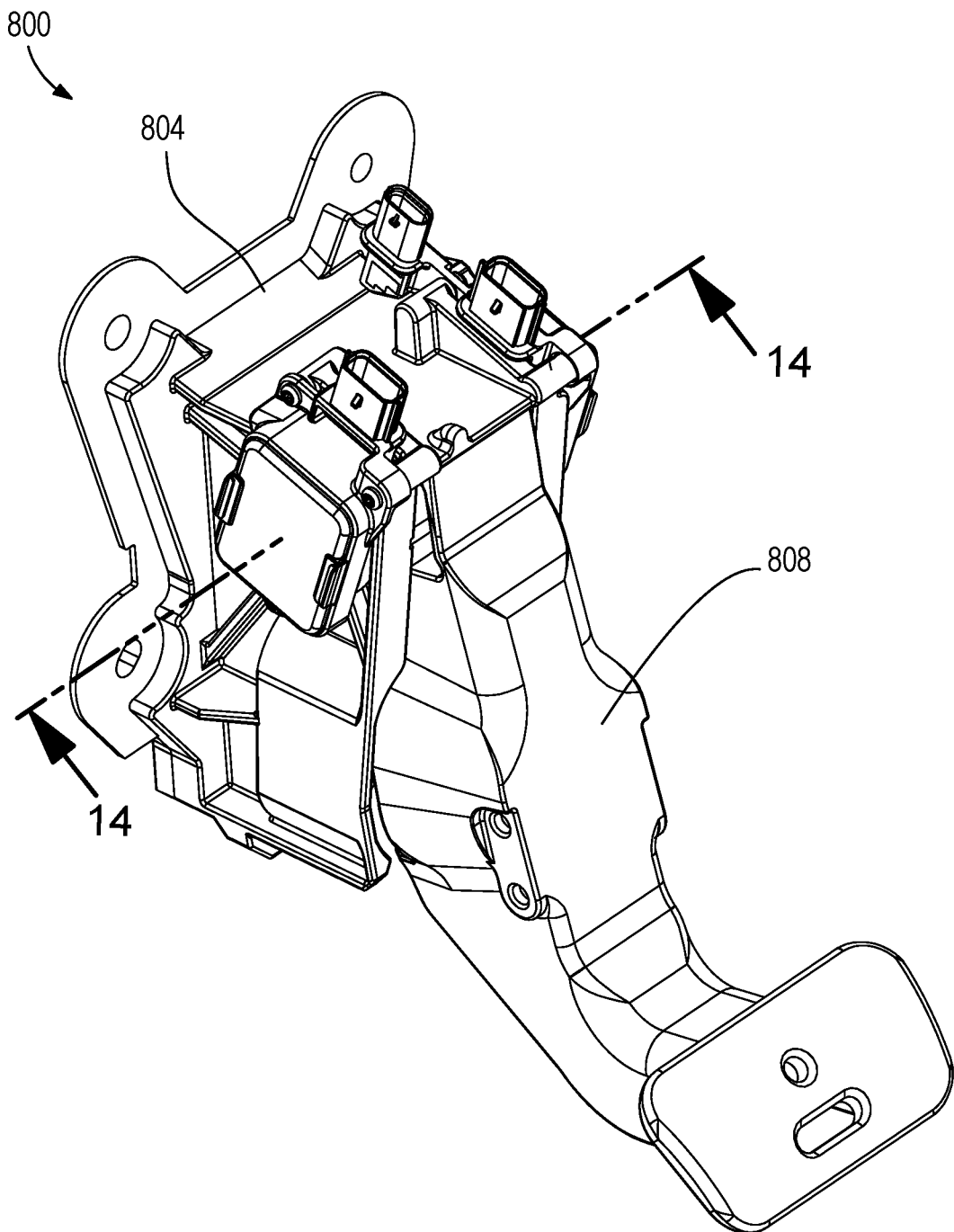
FIG. 13 is a perspective view of a pedal assembly according to another embodiment for use with the vehicle of FIG. 1.
Figure 14:
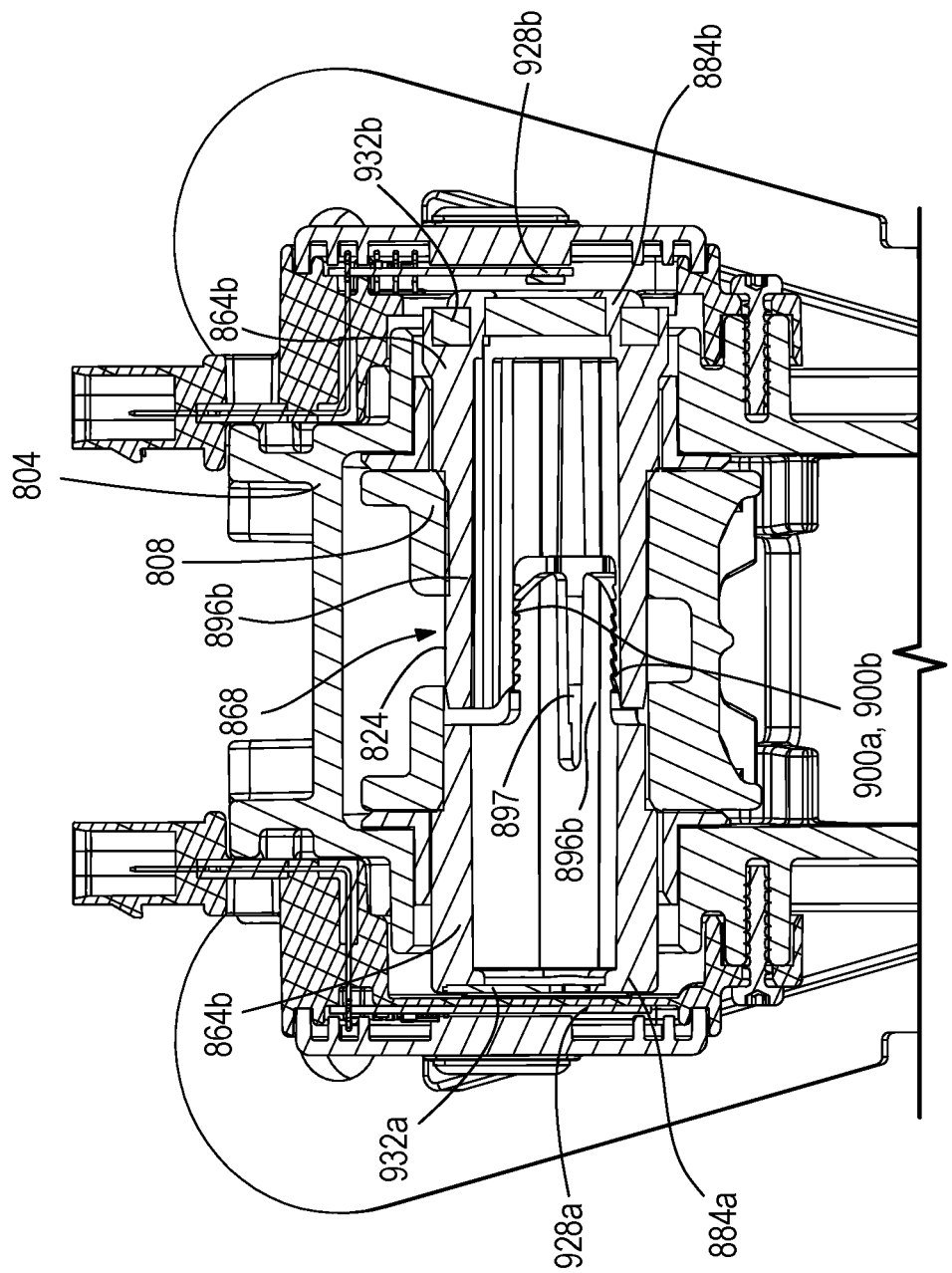
FIG. 14 is a cross-sectional view of the pedal assembly of FIG. 13 taken along line 14-14 of FIG. 13.
Figure 15:
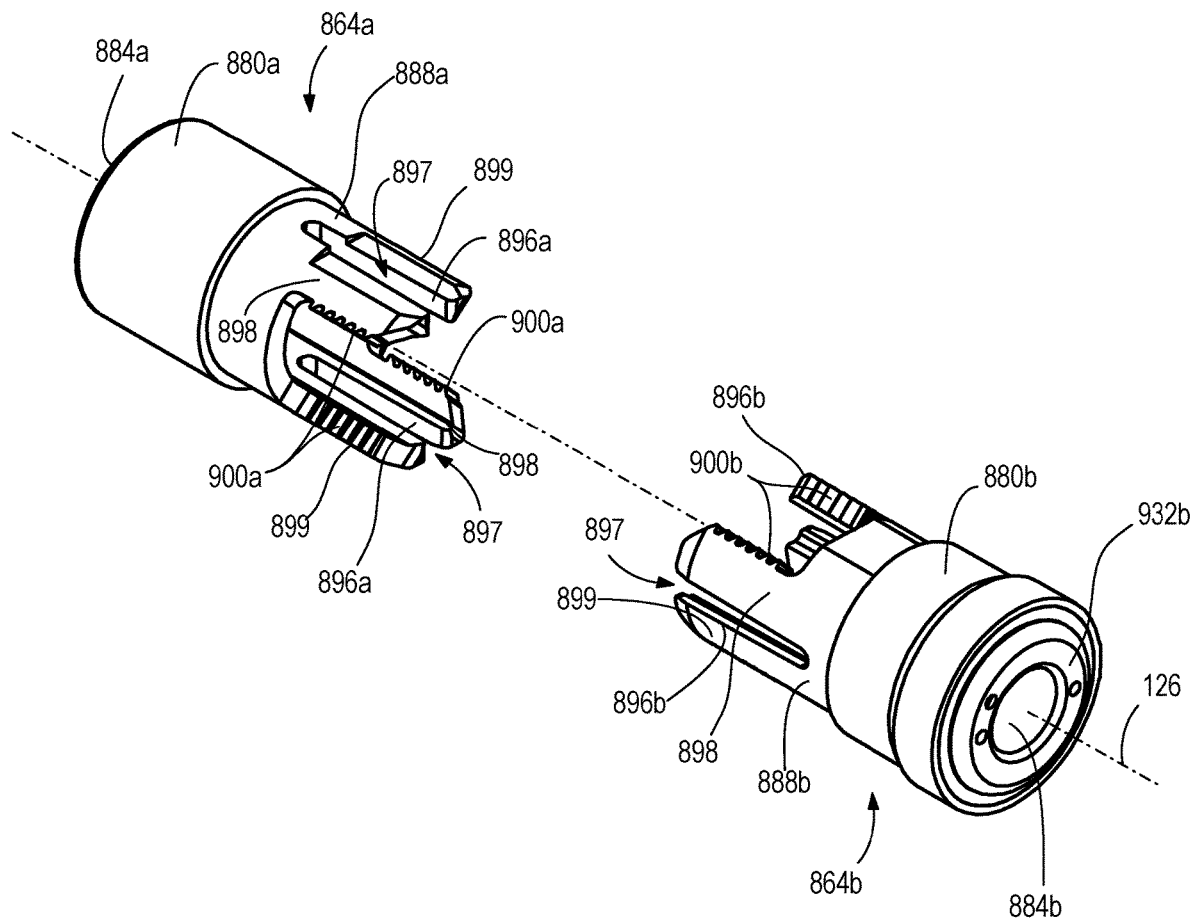
FIG. 15 is an exploded view of the pedal shaft of the pedal assembly of FIG. 13.

With reference to FIGS. 13-15, an alternative pedal assembly 800 is shown. As discussed above, the benefits of the jointed pedal shaft may be incorporated into pedal assemblies not including translational decoupling of the target element and the pedal shaft. The pedal assembly 800 includes a pedal shaft 824 having a first shaft portion 864a and a second shaft portion 864b coupled by a joint 868. The joint 868 is a one-way ratchet joint that is substantially similar to the joint 168 and only differences between the joints are described herein. As seen best in FIG. 15, the first shaft portion 864a includes a pair of ratchet fingers 896a and the second shaft portion 864b includes a pair of ratchet fingers 896b. Each ratchet finger 896a, 896b includes an axial slot extending lengthwise from a distal end of the ratchet finger along the pedal axis 126. In the illustrated embodiment, each axial slot 897 may extend partially into the mounting hub 888a, 888b. Each axial slot 897 subdivides the ratchet finger 896a, 896b such that a first portion 898 is deflectable with respect to a second portion 899. The ratchet fingers 896a, 896b each include a pair of toothed surfaces 900a, 900b. For example, one of the ratchet fingers 896a includes a first one of the toothed surfaces 900a on the first portion 898 and a second one of the toothed surfaces 900a on the second portion 899. During the coupling of the joint 868, the axial slots 897 provide the ratchet fingers 896a, 896b with greater flexibility to deform relative to the pedal axis 126 and decrease the force required to axially couple the shaft portions 864a, 864b. Specifically, the first portions 898 and second portions 899 of each ratchet fingers 896a, 896b may deflect inward (e.g., toward the axial slot 897), as the teeth on the toothed surfaces 900a, 900b ramp against each other. When the ratchet fingers 896a, 896b are engaged, the toothed surface 900a on the first portion 898 transmits the rotation to the corresponding toothed surface 900b on the first portion 898 of the ratchet finger 896b and the toothed surface 900a on the second portion 899 transmits rotation to the corresponding toothed surface 900b on the second portion 899 of the ratchet finger 896b.

With reference to FIG. 14, in the illustrated embodiment, the first shaft portion 864a and the second shaft portion 864b are structurally unique. The first shaft portion 864a includes a target element 932a coupled to the outer end 884a of the bearing hub 880a (FIG. 15). In the illustrated embodiment, the target element 932a is a metal element configured for use with an inductive position sensor of a sensor circuit 928*b*. The second shaft portion 864*b* includes a target element 932*b* positioned in a flared portion of the bearing hub 880*b*, adjacent the outer end 884*b*. In the illustrated embodiment, the target element 932*b* is a ring-shaped magnet for use with a Hall sensor of a sensor circuit 928*b*. In the illustrated embodiment, the target elements 932*a*, 932*b* are integrated (e.g., embedded) into the shaft portions 864*a*, 864*b*. In other embodiments, the target elements 932*a*, 932*b* may be coupled to a recess on the outer end 884*a*, 884*b*. The target elements 932*a*, 932*b* rotate with the pedal shaft 824 and the sensor circuits 928*a*, 928*b* are able to sense the position of the target elements 932*a*, 932*b* and generate a signal corresponding to a rotational position of the pedal shaft 824. As discussed above, the joint 868 in the pedal shaft 824 increases the ease of assembly and the modularity of the pedal assembly 800. In the illustrated embodiment, each shaft portion 864*a*, 864*b* may be selected based on the type of sensor used in the sensor circuit 928*a*, 928*b*, the configuration of the housing 804, the type of target element 932*a*, 932*b* coupled to the shaft portion 864*a*, 864*b*, and other considerations for each side of the pedal assembly 800. Additionally, the ratchet style joint 868 provides backup or secondary axial and radial locating of the shaft portions 864*a*, 864*b* independent from and capable of supporting the press fit between the pedal arm 808 and the mounting hubs 888*a*, 888*b* of the pedal shaft 824. The joint 868 increases the modularity of the system and adds backup locating features while maintaining an assembly that is easy to manufacture and assemble.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

Various features and advantages of the invention are set forth in the following claims.

What is claimed is:

1. A vehicular pedal assembly comprising:
   a pedal housing configured for mounting within a vehicle, the pedal housing including a first support and a second support;
   a pedal shaft supported by the pedal housing for rotation about a pedal axis, the pedal shaft including
      a first shaft portion coupled to the first support, and
      a second shaft portion formed separately from the first shaft portion and coupled to the second support, wherein the first and second shaft portions are configured to come together and form a joint;
   a pedal arm drivably engaged with the pedal shaft and configured to pivot in response to input of a driver to rotate the pedal shaft about the pedal axis; and
   a position sensor assembly coupled to the pedal shaft and operable to determine a rotational position of the pedal shaft and generate a signal based on the rotational position,
   wherein the joint is positioned between the first support and the second support, and
   wherein the first shaft portion includes
      a first bearing hub supported for rotation about the pedal axis in a first bore extending through the first support of the pedal housing,
      a first mounting hub extending from the first bearing hub along the pedal axis and coupled to the pedal arm to rotate therewith, and
      a first ratchet portion extending from the first mounting hub along the pedal axis.

2. The vehicular pedal assembly of claim 1, wherein
   the joint includes a first toothed surface disposed on the first ratchet portion and a second toothed surface disposed on the second shaft portion, and
   the first toothed surface engages the second toothed surface to axially couple the first shaft portion and the second shaft portion.

3. The vehicular pedal assembly of claim 2, wherein
   the first toothed surface and the second toothed surface are configured to allow axial coupling of the first shaft portion and the second shaft portion, and
   the first toothed surface and the second toothed surface are configured to inhibit axial separation of the first shaft portion and the second shaft portion.

4. The vehicular pedal assembly of claim 2, wherein
   each of the first toothed surface and the second toothed surface extends along the pedal axis, and
   each of the first toothed surface and the second toothed surface is oriented radially when viewed along the pedal axis.

5. The vehicular pedal assembly of claim 2, wherein
   the first toothed surface circumferentially engages the second toothed surface, and
   the circumferential engagement of the first toothed surface and the second toothed surface couples the first shaft portion and the second shaft portion for corotation.

6. The vehicular pedal assembly of claim 1, wherein the first shaft portion and the second shaft portion have identical constructions and the first shaft portion is offset 90 degrees about the pedal axis with respect to the second shaft portion.

7. The vehicular pedal assembly of claim 1, wherein
   the pedal housing includes a first bore extending through the first support of the pedal housing and a second bore extending through the second support of the pedal housing,
   the pedal shaft includes a first bearing hub rotatably supported in the first bore, a second bearing hub rotatably supported in the second bore, and a mounting hub disposed between the first bearing hub and the second bearing hub and coupled to the pedal arm to transmit rotation from the pedal arm to the pedal shaft, and the mounting hub has a width measured perpendicular to the pedal axis that is smaller than a width of either the first bearing hub or the second bearing hub.

8. The vehicular pedal assembly of claim 7, wherein the first shaft portion is coupled to the pedal arm for corotation therewith at a first opening, the second shaft portion is coupled to the pedal arm for corotation therewith at a second opening, and the joint is disposed between the first opening and the second opening.

9. The vehicular pedal assembly of claim 1, wherein the joint is configured to axially couple the first shaft portion to the second shaft portion and is configured to transmit rotation between the first shaft portion and the second shaft portion.

10. The vehicular pedal assembly of claim 1, wherein the pedal shaft extends along the pedal axis between a first end, disposed on the first shaft portion, and a second end, disposed on the second shaft portion, and wherein the first end and the second end each have a width measured perpendicular to the pedal axis that is larger than a width of a middle portion disposed between the first end and the second end.

11. A vehicular pedal assembly comprising:
a pedal housing configured for mounting within a vehicle, the pedal housing including a first support and a second support;
a pedal shaft supported by the pedal housing for rotation about a pedal axis, the pedal shaft including
a first shaft portion coupled to the first support, and
a second shaft portion formed separately from the first shaft portion and coupled to the second support, wherein the first and second shaft portions are configured to come together and form a joint;
a pedal arm drivably engaged with the pedal shaft and configured to pivot in response to input of a driver to rotate the pedal shaft about the pedal axis; and
a position sensor assembly coupled to the pedal shaft and operable to determine a rotational position of the pedal shaft and generate a signal based on the rotational position,
wherein the joint is positioned between the first support and the second support,
wherein the joint includes a plurality of ratchet fingers each including a first portion having a first toothed surface, a second portion have a second toothed surface, and a slot positioned between the first portion and the second portion,
wherein each one of the plurality of ratchet fingers engages an adjacent one of the plurality of ratchet fingers such that the first toothed surface of the one ratchet finger engages the first toothed surface of the adjacent ratchet finger to axially join the first shaft portion with the second shaft portion, and
wherein the slot is configured to allow the first portion of each ratchet finger to deflect as the first toothed surfaces are engaged.

12. A vehicular pedal assembly comprising:
a pedal housing configured for mounting within a vehicle, the pedal housing including a first support and a second support;

a pedal shaft supported by the pedal housing for rotation about a pedal axis, the pedal shaft including
a first shaft portion coupled to the first support, and
a second shaft portion formed separately from the first shaft portion and coupled to the second support, wherein the first and second shaft portions are configured to come together and form a joint;
a pedal arm drivably engaged with the pedal shaft and configured to pivot in response to input of a driver to rotate the pedal shaft about the pedal axis; and
a position sensor assembly coupled to the pedal shaft and operable to determine a rotational position of the pedal shaft and generate a signal based on the rotational position, wherein the joint is positioned between the first support and the second support,
wherein the pedal housing includes a first bore extending through the first support of the pedal housing and a second bore extending through the second support of the pedal housing,
wherein the pedal shaft includes a first bearing hub rotatably supported in the first bore, a second bearing hub rotatably supported in the second bore, and a mounting hub disposed between the first bearing hub and the second bearing hub and coupled to the pedal arm to transmit rotation from the pedal arm to the pedal shaft,
wherein the mounting hub has a width measured perpendicular to the pedal axis that is smaller than a width of either the first bearing hub or the second bearing hub,
wherein the first shaft portion is coupled to the pedal arm for corotation therewith at a first opening,
wherein the second shaft portion is coupled to the pedal arm for corotation therewith at a second opening,
wherein the joint is disposed between the first opening and the second opening,
wherein the mounting hub has a non-circular profile that corresponds to the first opening, and
wherein the first shaft portion is rotatably coupled to the pedal arm via an interference fit between the mounting hub and the first opening.

13. A method of assembling a vehicular pedal assembly, the method comprising:
mounting a pedal housing within a vehicle, the pedal housing having a first support and a second support;
positioning a pedal arm between the first support and the second support;
inserting a first shaft portion into a first bore in the first support by moving the first shaft portion along a pedal axis in a first direction;
coupling the first shaft portion to the pedal arm through the first bore;
inserting a second shaft portion into a second bore in the second support by moving the second shaft portion along the pedal axis in a second direction, opposite the first direction;
coupling the second shaft portion to the pedal arm through the second bore; and
coupling the first shaft portion to the second shaft portion between the first support and the second support to form a pedal shaft, and wherein the pedal shaft supports the pedal arm in the pedal housing for rotation about the pedal axis, wherein coupling the first shaft portion to the second shaft portion includes engaging a first toothed surface of the first shaft portion with a second toothed surface of the second shaft portion.

14. The method of claim 13, wherein inserting the first shaft portion into the first bore includes receiving a bearing hub of the first shaft portion in the first bore to support the first shaft portion for rotation about the pedal axis.

15. A method of assembling a vehicular pedal assembly, the method comprising:
mounting a pedal housing within a vehicle, the pedal housing having a first support and a second support;
positioning a pedal arm between the first support and the second support;
inserting a first shaft portion into a first bore in the first support by moving the first shaft portion along a pedal axis in a first direction;
coupling the first shaft portion to the pedal arm through the first bore;
inserting a second shaft portion into a second bore in the second support by moving the second shaft portion along the pedal axis in a second direction, opposite the first direction;
coupling the second shaft portion to the pedal arm through the second bore; and
coupling the first shaft portion to the second shaft portion between the first support and the second support to form a pedal shaft, and wherein the pedal shaft supports the pedal arm in the pedal housing for rotation about the pedal axis,
wherein inserting the first shaft portion into the first bore includes moving the first shaft portion inward along the pedal axis from an outer side of the first support toward the second support, and wherein inserting the second shaft portion into the second bore includes moving the second shaft portion inward along the pedal axis from an outer side of the second support toward the first support.

16. A method of assembling a vehicular pedal assembly, the method comprising:
mounting a pedal housing within a vehicle, the pedal housing having a first support and a second support;
positioning a pedal arm between the first support and the second support;
inserting a first shaft portion into a first bore in the first support by moving the first shaft portion along a pedal axis in a first direction;
coupling the first shaft portion to the pedal arm through the first bore;
inserting a second shaft portion into a second bore in the second support by moving the second shaft portion along the pedal axis in a second direction, opposite the first direction;
coupling the second shaft portion to the pedal arm through the second bore; and
coupling the first shaft portion to the second shaft portion between the first support and the second support to form a pedal shaft, and wherein the pedal shaft supports the pedal arm in the pedal housing for rotation about the pedal axis, wherein inserting the first shaft portion into the first bore includes receiving a bearing hub of the first shaft portion in the first bore to support the first shaft portion for rotation about the pedal axis,
wherein coupling the first shaft portion to the pedal arm includes
inserting a first ratchet portion of the first shaft portion into a first opening of the pedal arm,
translating the first shaft portion along the pedal axis until a mounting hub is received in the first opening, and
fitting the mounting hub into the first opening using an interference fit.

17. The method of claim 16, wherein coupling the second shaft portion to the pedal arm includes inserting a second ratchet portion of the second shaft portion into a second opening of the pedal arm, and wherein coupling the first shaft portion to the second shaft portion within the pedal arm includes engaging the first ratchet portion and the second ratchet portion between the first opening and the second opening.

18. The method of claim 17, wherein the first ratchet portion and the second ratchet portion each include toothed surfaces extending along the pedal axis and, and wherein engaging the first ratchet portion and the second ratchet portion includes engaging the toothed surfaces to create a circumferential engagement that couples the first shaft portion for corotation with the second shaft portion.

19. The method of claim 17, wherein coupling the first shaft portion to the second shaft portion includes ramping a first toothed surface disposed on the first shaft portion against a second toothed surface disposed on the second shaft portion such that a portion of the first shaft portion deflects with respect to the pedal axis.

20. A vehicular pedal assembly comprising:
a pedal housing configured for mounting within a vehicle;
a pedal shaft supported by the pedal housing for rotation about a pedal axis, the pedal shaft having
a first shaft portion,
a second shaft portion, and
a one-way ratchet joint coupling the first shaft portion and the second shaft portion for corotation about the pedal axis;
a pedal arm drivably engaged with the pedal shaft and configured to pivot in response to input of a driver to rotate the pedal shaft about the pedal axis; and
a position sensor assembly operable to determine a rotational position of the pedal shaft and generate a signal based on the rotational position.

21. The vehicular pedal assembly of claim 20, wherein
the one-way ratchet joint allows movement of the first shaft portion and the second shaft portion toward each other, and
the one-way ratchet joint inhibits movement of the first shaft portion and the second shaft portion away from each other.

22. The vehicular pedal assembly of claim 20, wherein
the one-way ratchet joint includes a first ratchet surface disposed on the first shaft portion and a second ratchet surface disposed on the second shaft portion, and
the first ratchet surface engages the second ratchet surface along the pedal axis to prevent axial separation of the first shaft portion and the second shaft portion.

23. The vehicular pedal assembly of claim 22, wherein the first ratchet surface is circumferentially engaged with the second ratchet surface and is configured to transmit rotation from the first shaft portion to the second shaft portion.

* * * * *